US010069304B2

(12) United States Patent
Bhowmik et al.

(10) Patent No.: US 10,069,304 B2
(45) Date of Patent: Sep. 4, 2018

(54) SYSTEM AND METHOD FOR ISLANDING DETECTION AND PREVENTION IN DISTRIBUTED GENERATION

(71) Applicants: Shibashis Bhowmik, Charlotte, NC (US); Iman Mazhari, Charlotte, NC (US); Babak Parkhideh, Charlotte, NC (US)

(72) Inventors: Shibashis Bhowmik, Charlotte, NC (US); Iman Mazhari, Charlotte, NC (US); Babak Parkhideh, Charlotte, NC (US)

(73) Assignees: SINEWATTS, INC., Charlotte, NC (US); THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 412 days.

(21) Appl. No.: 14/737,468

(22) Filed: Jun. 11, 2015

(65) Prior Publication Data

US 2015/0380940 A1    Dec. 31, 2015

Related U.S. Application Data

(60) Provisional application No. 62/010,518, filed on Jun. 11, 2014.

(51) Int. Cl.
    *H02J 3/38*    (2006.01)
(52) U.S. Cl.
    CPC ......... *H02J 3/382* (2013.01); *H02J 2003/388* (2013.01)
(58) Field of Classification Search
    None
    See application file for complete search history.

(56) References Cited

U.S. PATENT DOCUMENTS

| 6,219,623 B1 * | 4/2001 | Wills ............... H02J 3/383 290/40 B |
| 6,268,666 B1 | 7/2001 | Bhowmik |
| 7,427,815 B1 | 9/2008 | Ye et al. |
| | | (Continued) |

FOREIGN PATENT DOCUMENTS

WO    WO 2013/009877 A2    1/2013

OTHER PUBLICATIONS

Mazhari, et al., "Locking Frequency Band Exposure Method for Islanding Detection and Prevention in Distributed Generation", Energy Conversion Congress and Exposition (ECCE), 2014 IEEE, Sep. 14, 2014, pp. 4361-4366.

(Continued)

*Primary Examiner* — Jared Fureman
*Assistant Examiner* — James Evans
(74) *Attorney, Agent, or Firm* — K&L Gates LLP

(57) ABSTRACT

A method for detecting and preventing islanding includes issuing a command to an inverter connected to a power source, where the inverter is coupled to a power grid and supplies power to the power grid, the command causes a frequency of a waveform output by the inverter to vary, and the frequency of the waveform output by the inverter is a command frequency, determining that a amount of change of the command frequency is a constant value for a predetermined amount of time, removing the power supplied by the inverter from the power grid, and determining whether the power grid is valid.

20 Claims, 21 Drawing Sheets

(56) References Cited

U.S. PATENT DOCUMENTS

| | | | |
|---|---|---|---|
| 8,334,618 B2* | 12/2012 | Bhavaraju | H02J 3/38 307/86 |
| 8,780,592 B1* | 7/2014 | Jones | H02J 3/383 323/906 |
| 9,692,319 B1 | 6/2017 | Slavin | |
| 2003/0165036 A1* | 9/2003 | Tuladhar | H02J 3/38 361/62 |
| 2004/0051387 A1* | 3/2004 | Lasseter | H02J 3/46 307/80 |
| 2006/0004531 A1* | 1/2006 | Ye | G01R 19/2513 702/60 |
| 2006/0208574 A1* | 9/2006 | Lasseter | H02J 3/38 307/69 |
| 2008/0002442 A1* | 1/2008 | Petter | H02M 7/493 363/41 |
| 2008/0122293 A1 | 5/2008 | Ohm | |
| 2011/0115301 A1* | 5/2011 | Bhavaraju | H02J 3/38 307/86 |
| 2011/0164440 A1* | 7/2011 | Krein | H02M 1/32 363/95 |
| 2011/0215652 A1* | 9/2011 | Gengenbach | H02J 3/18 307/87 |
| 2011/0276192 A1 | 11/2011 | Ropp | |
| 2011/0309804 A1 | 12/2011 | Yasugi | |
| 2012/0029716 A1* | 2/2012 | Sekoguchi | H02J 3/38 700/293 |
| 2013/0181527 A1 | 7/2013 | Bhowmik | |
| 2014/0265573 A1* | 9/2014 | Kreutzman | F24H 1/0018 307/31 |

OTHER PUBLICATIONS

Mazhari, et al., "Locking Frequency Band Detection Method for Grid-tied PV Inverter Islanding Protection", Energy Conversion Congress and Exposition (ECCE), 2015 IEEE, Sep. 20, 2015, 6 pages.

* cited by examiner

SYSTEM AND METHOD FOR ISLANDING DETECTION AND PREVENTION IN DISTRIBUTED GENERATION

CROSS-REFERENCE TO RELATED APPLICATIONS

This application claims the benefit of priority to U.S. Provisional Patent Application No. 62/010,518, filed on Jun. 11, 2014, the entirety of which is incorporated herein by reference.

STATEMENT REGARDING FEDERALLY SPONSORED RESEARCH/DEVELOPMENT

This invention was made with Government support under Award Number DE-EE0006459 by the Department of Energy. The Government has certain rights in the invention.

BACKGROUND

As distributed generation (DG) systems become part of the power grid, there is an increased safety hazard caused by islanding for personnel and more risk of damage to the equipment. Islanding refers to the condition in which a distributed generator (DG) continues to power a segment of a distribution network or grid even though electrical grid power from the electric utility is no longer present. As shown in FIGS. 1A and 1B, the islanding phenomenon happens when the grid is intentionally or accidentally disconnected from the network and the DG continues to energize local loads. FIG. 1A shows a grid network 100 before islanding occurs and FIG. 1B shows a grid network 100 after islanding occurs. As seen from FIG. 1B, when an islanding condition exists, the main power system 102, which may be a power source provided by a utility company, an electricity cooperative, permanent or semi-permanent generation, etc., is disconnected from the rest of the grid network 100 by the dis-connection 102, whereby, the DG units 106 will feed the load 108 unless the DG units cease to generate power.

Aside from the danger to maintenance personnel arriving to service a circuit, also called a feeder, that is energized by DG systems, there are also operational issues due to islanding. The voltage and frequency may not be maintained within the range of IEEE 1547-2003 standard. This standard stipulates a maximum delay of 2 seconds for detection on an unintentional island and all DG systems are required to cease energizing the load network, which may be a power grid. Typically, the islanded system may also be insufficiently grounded by the interconnection inside the DG. Reclosure operations that are initiated by the utility to clear the fault may also cause large mechanical torques, along with currents, particularly at in-rush, which are harmful for equipment in the islanded network.

A common example of islanding may occur at a grid supply line that has solar panels attached to it. In the case of a blackout, the solar panels will continue to deliver power as long as there is sufficient sunlight. In this case, the supply line becomes an "island" with power surrounded by a "sea" of unpowered lines. For this reason, solar inverters that are designed to supply power to the grid are generally required to have some sort of automatic anti-islanding circuitry in them.

Islanding detection methods can be classified into two major groups: remote and local methods. Remote techniques are based on the communication between utilities and DG systems such as power line communication, and supervisory control and data acquisition that do not have non-detection zone (NDZ), but are expensive to be implemented and therefore uneconomical. NDZs are defined as a loading condition for which an islanding detection method is unable to detect islanding. Local techniques, which are just related to the DG, can be classified into two major categories: passive and active methods. Passive methods are based on measuring local parameters of DG and comparing the parameters to a reference value. Some commonly applied passive methods are over/under frequency protection (OFP/UFP), over/under voltage protection (OVP/UVP), phase jump detection, voltage harmonic monitoring and change in grid impedance detection. While these methods are simple to implement, typically, they fail to detect islanding in one or more powering/loading condition(s) leading to NDZ(s) for these methods. NDZs exist for OVP/UVP or OFP/UFP methods when the inverter generated power closely matches that of the load and, for the phase jump detection method when the load power factor is unity.

Active methods strive to reduce the NDZs associated with typical passive methods by adding field quantities, such as voltage, current, perturbations to the inverter. Some active methods include: (i) Output power variation method requires multiple DGs but it fails when synchronization is not met due to the averaging effect; (ii) Active frequency drift (AFD) method requires adding small increments/decrements in the frequency of the inverter output current while monitoring the frequency of the voltage. AFD fails to detect an islanding condition when the load phase angle matches the phase offset of the perturbation. Sandia frequency shift (SFS) method which is an active frequency adjustment improves the performance of the AFD method by adding positive feedback to adjust the frequency away from the nominal value faster than the AFD method. Potential islanding conditions may be detected by the SFS method when the frequency traverses out of the acceptable range. However it may also fail as the phase angle of the load depends on the operating frequency. Accordingly, there is a need for systems and methods that are cost efficient and effective at detecting whether an Islanding condition exists.

BRIEF DESCRIPTION OF DRAWINGS

Aspects of the present invention is further described in the detailed description which follows in reference to the noted plurality of drawings by way of non-limiting examples of example embodiments of the present invention in which like reference numerals represent similar parts throughout the several views of the drawings and wherein.

DETAILED DESCRIPTION

Figure 1A:
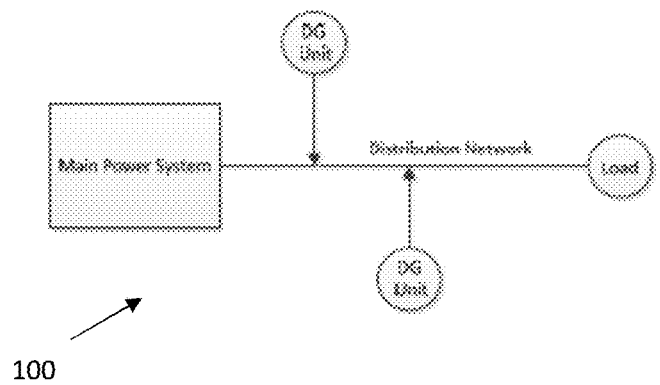
FIG. 1A is an illustration of a network before an islanding condition has occurred.
Figure 1B:
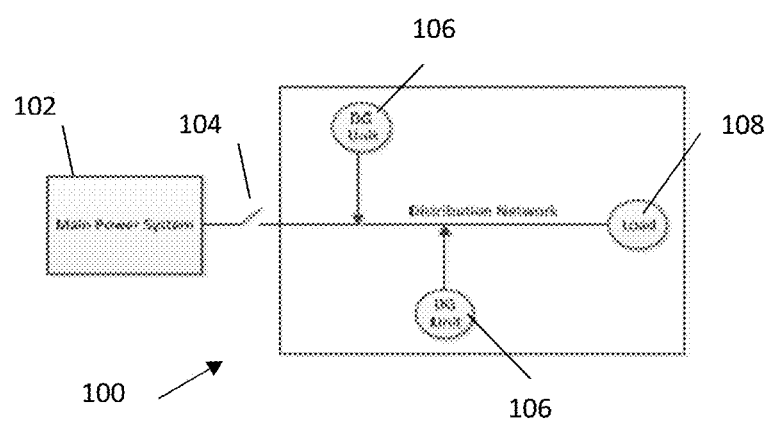
FIG. 1B is an illustration of a network after an islanding condition has occurred.

In various examples, a grid frequency is determined by the speed at which the generators in the generating plant run for a power grid. When the power demand exceeds the power generation, the grid frequency falls, and vice-versa. During conditions when the power demand on the grid matches very closely to that of generation, the grid frequency does not vary appreciably. Some examples described herein include active methods for detecting and mitigating islanding. Accordingly, controllers, as described herein, may be provided for creating a command frequency which is to be applied to the inverter of a DG system. DG systems may include any equipment that is capable of generating electricity at distributed locations on an electric grid. Example DG systems may include generators powered by Photovoltaic (PV) cells, wind, water, steam, fuel combustion, biomass, biogas, geothermal power, combinations thereof, etc. The controller may measure variations of the command frequency. The measured variations may indicate the condition of the grid. If the controller detects that the variations of the command frequency have become constant, it may indicate that the grid has entered a resonant or tank condition, as described herein and/or may indicate an islanding condition. A tank condition may occur when the main power source, which may be from a utility, is still connected, and the frequency variation of the power provided by the main power source is very small, such that it is between nominal values. In some examples, a tank condition may also be considered to occur when the power provided is at a resonant frequency.

In some example embodiments of the present disclosure, a sampled frequency at the point of common coupling (PCC) of an inverter of a DG system, added with some disturbance, generates a command frequency. Any suitable disturbance may be included in the command frequency including, for example, a constant, a polynomial signal, a linear signal, a noise signal, etc. By measuring the variations of this command frequency, the condition of the power grid can be detected. For example, when there is an exact power match between the DG and the load to be served, the grid may be in a tank condition (e.g., when the match is not due to a disconnect between the DG and the grid power source) and/or an islanding condition (e.g., where the DG is disconnected from the grid power source). In some examples, it may be possible to discriminate between these two conditions based on the system's behavior, as described herein. Example embodiments of the present disclosure for detecting the condition of a power grid have been shown to be robust, able to detect both islanding and tank, and simple to be implemented. Relying only on frequency adjustment, provides for a system that has minimal to no impact on the maximum power point tracking (MPPT) operation of a PV device(s) that operates as a DG system and that has a fast response to a determined condition of the grid.

Various example embodiments of the present disclosure may detect an island condition by identifying a locking frequency band and may be categorized as an active method compared with other common methods. The low cost due to the simplicity of implementation of the systems and methods disclosed herein, not having the NDZ, and its robustness are also highlighted advantages of the present disclosure.

Example embodiments of the present application include a controller and/or anti-islanding detection circuit in order to provide protection for distributed power generators. In one example embodiment, the anti-islanding detection circuit uses an algorithm based on a continuous frequency adjustment of the distributed generators. The frequency adjustment of each distributed generator may impact the frequency variation of the output voltage of that distributed generator. For example, under closely-matched generator and load capacity conditions, the frequency variation may remain locked below a predetermined threshold. When the frequency variation remains locked for a threshold time period, the controller may initiate a sequence of steps to determine whether there is a grid outage (e.g., whether the grid is valid). If there is a grid outage, the distributed generator may be turned off. Under generator and load capacity conditions that are not closely-matched, the controller may detect when the frequency of the output exceeds frequency trip limits and when this is detected, it may determine an islanding condition and terminate operation of the distributed generator.

Systems and method of the present disclosure allow the dissociation between an islanding condition and tank condition, as described herein. According to example embodiments, the systems and methods described herein may not have non-detection zones (NDZs), and may have no or minimal impact on the power quality of DG. According to example embodiments the algorithm may be a part of inverter controller. It is noted that an NDZ is referred to herein as a loading condition for which an islanding detection method is unable to detect that the islanding condition is present.

In one example embodiment, a method for detecting and preventing islanding may include sending a command to control a frequency of the distributed generator applied to a power grid; determining that a tank condition has occurred in response to determining that a change of the frequency of the power grid is constant for a predetermined amount of time; measuring voltage/current of the power grid in response to determining that a tank condition has occurred; and detecting that islanding has occurred in response to measuring zero voltage/current of the power grid when the frequency being applied to the power grid is interrupted.

Example embodiments of the present disclosure comprise devices, equipment, methods, for anti-islanding detection, such as active anti-islanding detection. In various examples, a command frequency is applied to the inverter of distributed generator, such as a Photovoltaic (PV) system). A controller may measure variations of the command frequency to determine a condition of the power grid. If the variations of the command frequency command become constant, either a tank condition or an islanding condition may have occurred. Also, according to some example embodiments of the present disclosure, it may be possible to discriminate between these two conditions, tank or islanding, based on the behavior of the command frequency, as described herein.

Figure 2:
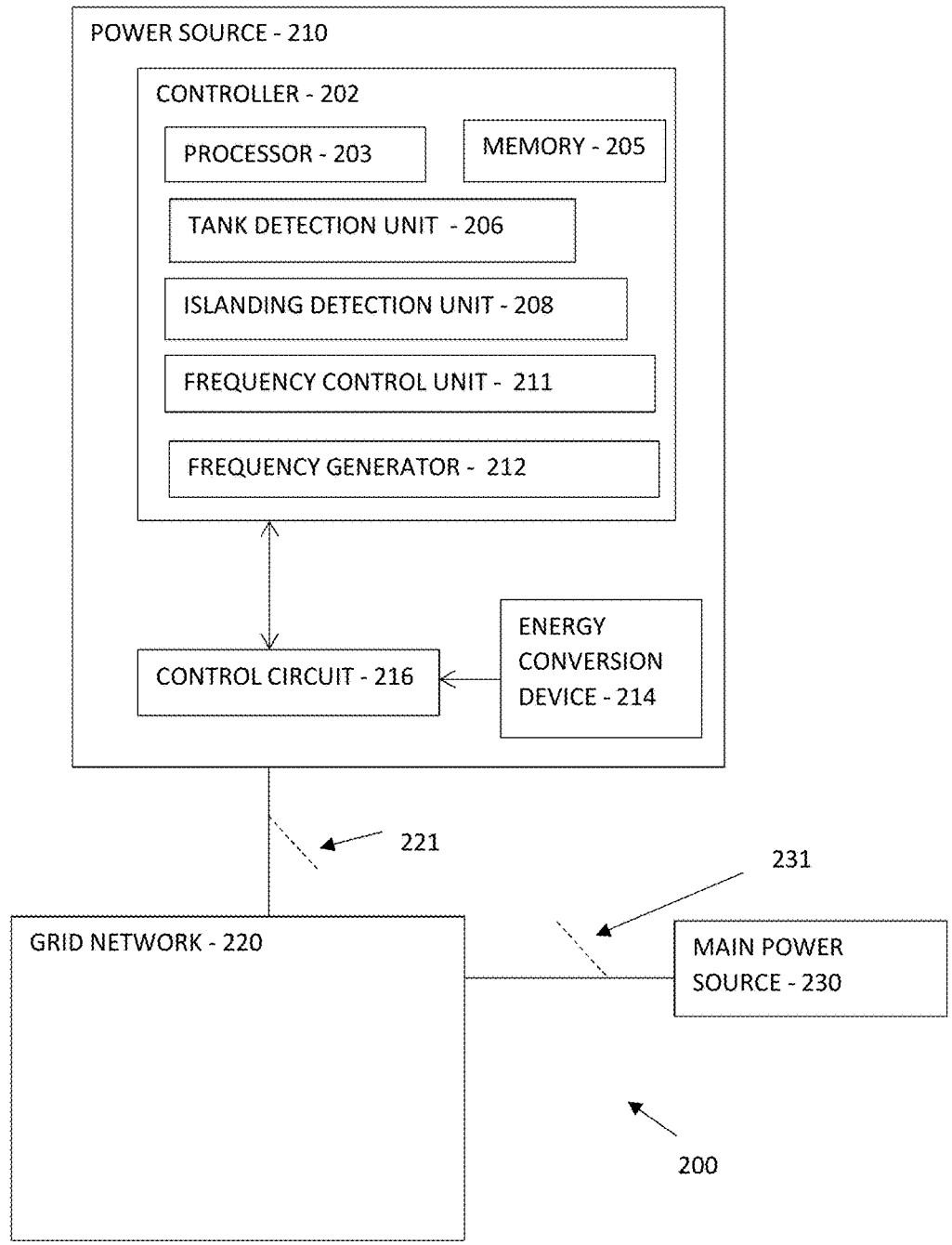
FIG. 2 is a is a system of islanding detection in accordance with an example embodiment.

FIG. 2 illustrates a system 200 of islanding detection in accordance with an example embodiment. As shown, a grid 220 is connected to a main power source 230 and another power source 210. The main power source 230 may be a power source provided by a utility company, an electricity cooperative, permanent or semi-permanent generation, etc. Power source 210 may comprise a controller 202. The controller 202 may comprise various components that are configurable and/or programmable to determine when tank and/or islanding has occurred and thus control other components that are part of or are associated with the power source 210, such as connection 221, when islanding has been detected. With reference to FIG. 2, islanding may occur when the main power source 230 has been disconnected to the grid via connection 231. Islanding may occur for various reasons, such as for example, if a worker is working on the grid and has disconnected the power source 230, if a fault has occurred along a power line of the grid network 220, if the main power source 230 fails, etc. When islanding occurs, the power source 210 should be disconnected so that power is not applied to the grid. As described herein, some regulatory regimes may require that the power source 210 be disconnected within two seconds (or another suitable threshold time) of the occurrence of the islanding condition. According to various example embodiments, connections 221 and 231 may be switches that are sized appropriately for the parameters of installation. Accordingly, the switches 221, 231 may be single or multiple phase switches, and they may be made to handle maximum voltage and/or maximum current. Additionally, switch 221 may be a component of the power source 210.

Power source 210 may be any suitable distributed generation power source, as described herein. The power source 210 may include an energy conversion device 214 to convert non-electrical energy to electrical power. Example conversion devices 214 include photovoltaic cells, wind mills, internal combustion engines, fuel cells, geothermal elements, etc. Electrical power from the energy conversion device 214 may be provided to a control circuit 216 and the electrical power then is sent to the grid 220. For example, the control circuit 216 may comprise an inverter for the distributed generator, microprocessors, microcontrollers, associated analog and digital control circuits, etc., for processing power generated by the power source 210 to the grid 220.

Controller 202 may be connected to the control circuit 216 and include a frequency control unit 211 to control a frequency of the signal applied to the grid 220 by the power source 210. In this regard, the frequency control unit 211 may send a signal to increase or decrease the frequency of the signal applied to the grid 220. According to example embodiments, the frequency measured from the grid may be different than the frequency that is applied to the grid 220. This may indicate, for example, a tank condition and/or an islanding condition.

The controller 202 may also include a processor 203 that is configured to performed operations disclosed herein. The controller 202 may also include memory 205 to store computer-related instructions to be performed by the processor 203. The controller 202 may also include a tank detection unit 206 that performs operations discussed herein to detect a tank condition. The tank detection unit 206 may be implemented in hardware or, in some examples, may be comprise software to be executed by the processor 203. The controller 202 may also include an island detection unit 208 that performs operations discussed herein to detect islanding. The island detection unit 208 may be implemented in hardware or, in some examples, may comprise software to be executed by the processor 203.

Figure 3:
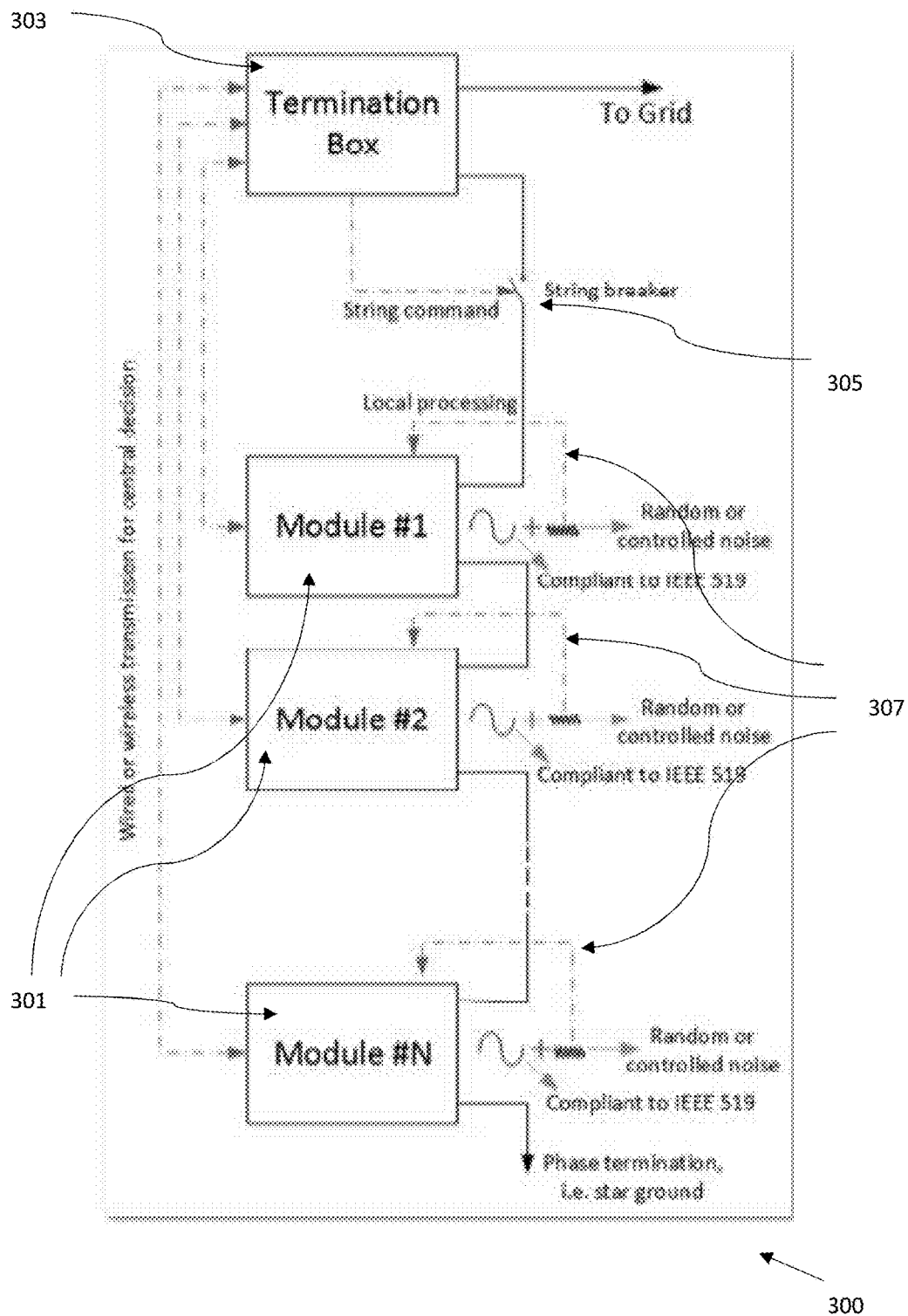
FIG. 3 illustrates a system of islanding detection and prevention in accordance with an example embodiment.

FIG. 3 shows aspects of an example embodiment of a configuration 300 to implement aspects of an anti-islanding systems as described herein. In the configuration 300 shown in FIG. 3, modules 301, which may be central or string inverters coupled to distributed generation sources, such as PV panels, are connected together and are then coupled to a termination box 303, which is connected to a power grid. According to various example embodiments, the inverter may reside on the back of a PV panel. In some examples, some or all of the inverters (e.g., modules 301) may have form factors that are about the size of a business card. As shown in FIG. 3, the configuration 300 shows that the modules 301 are series connected, however, in other example embodiments one or more of the modules 301 may be connected in parallel to another module 301.

Additionally, bypass mechanisms may be included in the event that a module 301 goes bad and a path around must be provided. According to one example embodiment, up to ⅓ of the number of modules in a configuration of modules may be bypassed, for example if they malfunction. Each module 301 may be configured to produce a small voltage and the modules 301 are coupled together to connect to the grid. Thus the modules 301 share the burden of connecting to the grid in a segmented manner. The number of modules employed in a particular configuration may be based on a particular power requirement and/or a particular voltage requirement. Additionally, a group of modules may be employed as a configuration in a distribution or transmission setting, and/or in a residential or industrial setting.

In one example embodiment, each module 301 generates a main waveform 307, which may be compliant with IEEE 519 that is fed back into the modules 301. The main waveform 307 is ultimately applied to the grid that the configuration is connected to. For example, the main waveform 307 may exhibit the command frequency, as described herein.

In some examples, in addition to the main waveform 307, each module 301 may also generate a random or controlled noise. The random or controlled noise may be generated with an amplitude that is reduced (e.g., significantly reduced) as compared to the main waveform 307. The information of the noise at each module 301 may be compiled at a central location. In one example embodiment, the compilation may be performed locally, and may be accomplished via a local controller coupled to the modules 301. The random or controlled noise may be utilized to generate the command frequency, for example, as described herein. A local controller may be located, for example, at the termination box 303. Additionally in another example embodiment, the noise at each module 301 may be compiled remotely, for example by a remote controller at a power generation source, such as a power plant. The result of this compilation may be a flag or similar signal that is transmitted from each module 301 to a central location at the power generation source, such as a plant, or a central location coupled to the modules 301, such as termination box 303. The transmission of the flag or similar signal can be accomplished wirelessly or wired separately, or also may be accomplished via a transmission on the power line.

The local controller may receive and compile all flag or similar signals from the modules 301 and send out the necessary commands to a string breaker 305 to disconnect the modules from the grid when a condition is met. In one example embodiment, the local controller, which may be located in the termination box 303, listens to all the flag signals and takes action if there is a consensus among the modules. An action by the local controller may include controlling the string breaker 305 to open and disconnect the modules 301 from the grid. Additionally, the modules 301 may be configured such that they act autonomously and coordinate among themselves to connect to the grid. For example, each module 301 comprise and/or service a power source, such as the power source 210 described herein. Each module 301 may individually determine the presence or absence of a tank or island condition. Individual tank or island condition detections may be aggregated at the local controller in any suitable manner with results provided to the termination box 303.

In other example embodiments, additional string breakers may be included in between each module 301 or at locations between a predetermined number of modules 301. Further, in additional example embodiments the modules 301 coordinate among themselves autonomously such that no control communication is required to be provided to the modules such that for the modules 301 to operate together, there is no need for a control communication to be provided to the modules. Further details regarding the architecture of a plurality of modules are disclosed in U.S. Patent Application Publication No. 2013/0181527, which is herein incorporated by reference in its entirety.

Figure 4:
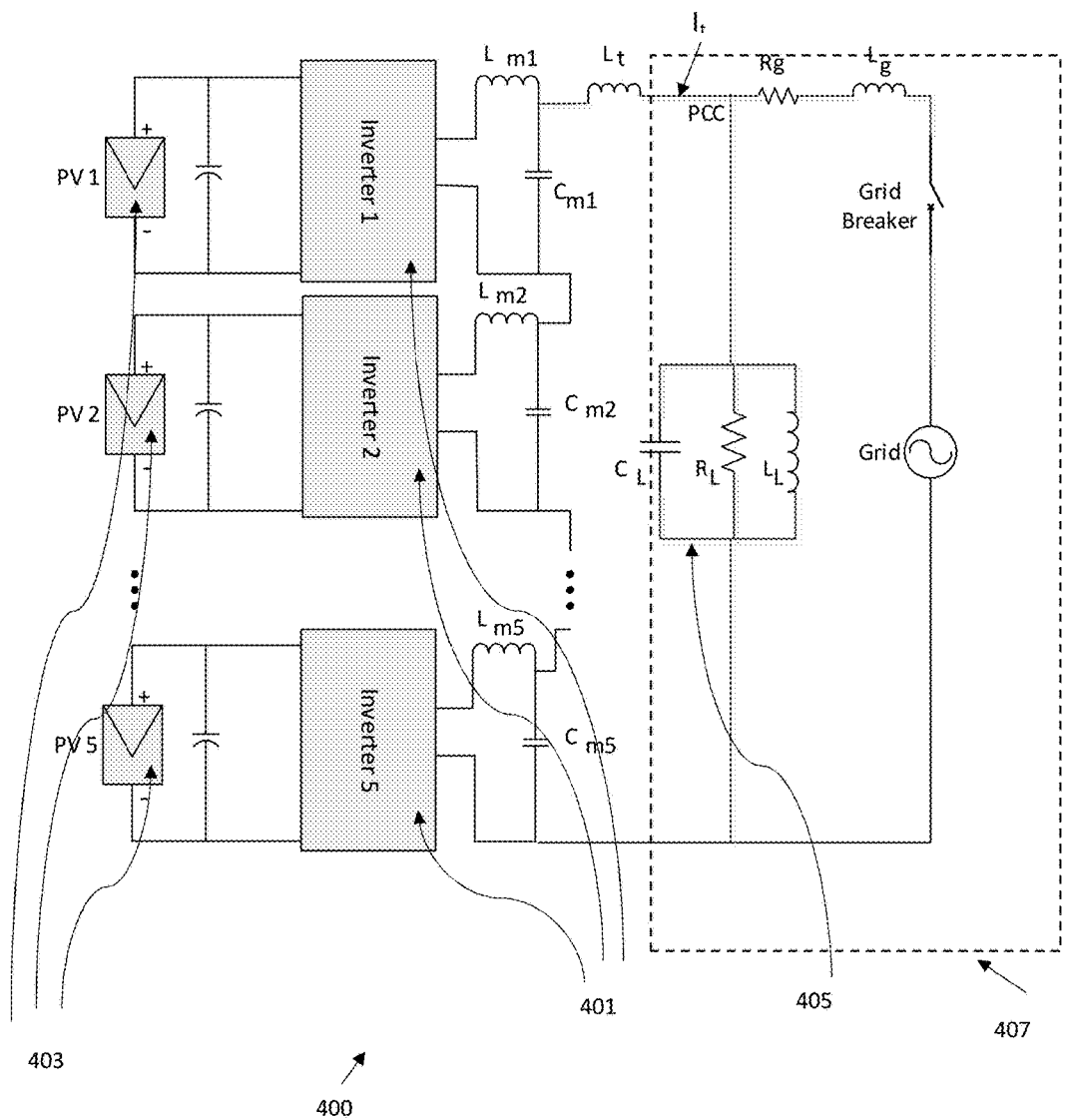
FIG. 4 illustrates a system of islanding detection and prevention using multiple inverters in accordance with an example embodiment.

FIG. 4 illustrates a system 400 of islanding detection and prevention using multiple inverters 401 in accordance with an example embodiment of the present disclosure. As shown, there are photovoltaic (PV) power sources 403 (labeled as "PV1", "PV2" . . . "PV5") that act as a series of power generators and each are connected to the power grid in parallel. The number of PV power sources 403 of a particular system may vary depending on desired loading and/or voltage conditions. Additionally, each photovoltaic source 403 is connected to a respective inverter 401 which controls the output of power from the photovoltaic source 403 to the power grid 407. The inverter 401 may be part of a control circuit of the power source 403, similar to that described with regard to the control circuit 216 of FIG. 2. It should be noted that other devices may be used in between the power source and the grid, and the present disclosure should not be limited to an inverter for this function and any component performing the functions of the inverter described herein may be used. Also, some or all of the photovoltaic sources 403 and/or inverters 401 may be associated with a controller for detecting islanding conditions as described herein (not shown in FIG. 4). Also, although photovoltaic power sources 403 are shown in FIG. 4, the configuration of FIG. 4 may be used with any other suitable type of distributed generation source, as described herein. FIG. 4 shows current $I_f$, which may be the current waveform having a frequency that is defined as the command frequency according to example embodiments of the present disclosure. Current $I_t$ is the current provided by the each of the inverters 401 based on the PV power sources 403.

Figure 5:
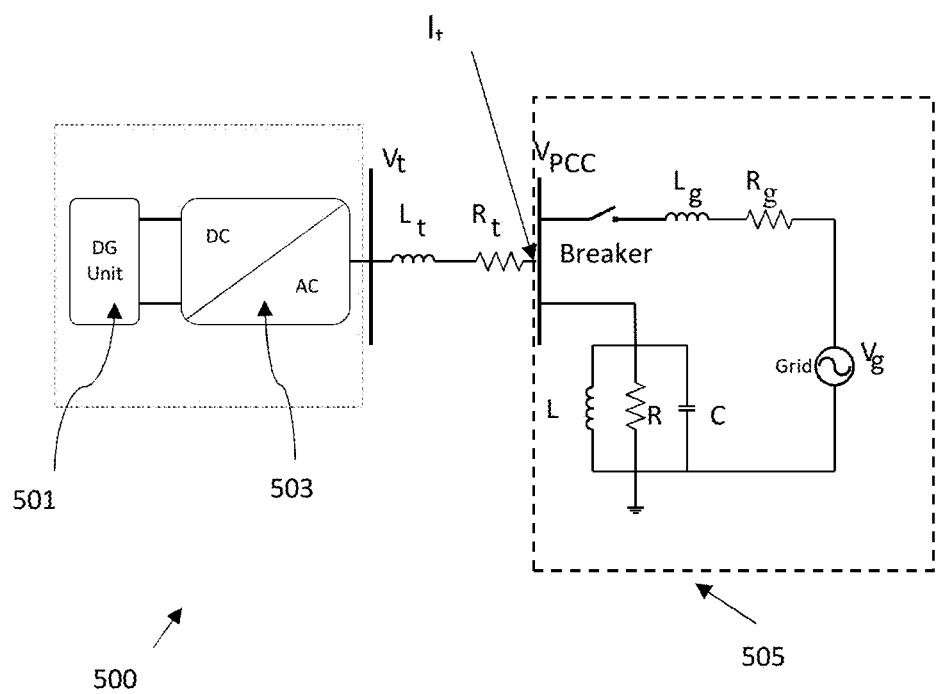
FIG. 5 illustrates a system of islanding detection and prevention using a single inverter in accordance with an example embodiment.

Additionally, it should be noted that the system 400 could be applied with multiple power sources and multiple inverters, but it should be recognized that any number of power source/inverter combinations may be possible. For example, FIG. 5 illustrates a system 500 used for islanding detection and prevention that comprises a single phase inverter 501 and a distributed generator 501 connected to a grid 505 in accordance with an example embodiment of the present disclosure. In some examples, the distributed generator 501 and inverter 503 may be associated with a controller for detecting islanding conditions, for example, as described herein. Similar to FIG. 4, FIG. 5 shows current $I_f$, which may be the current waveform having a frequency that is defined as the command frequency according to example embodiments of the present disclosure. Current $I_t$ is the current provided by the inverter 503 based on the PV power sources 501.

Figure 6:
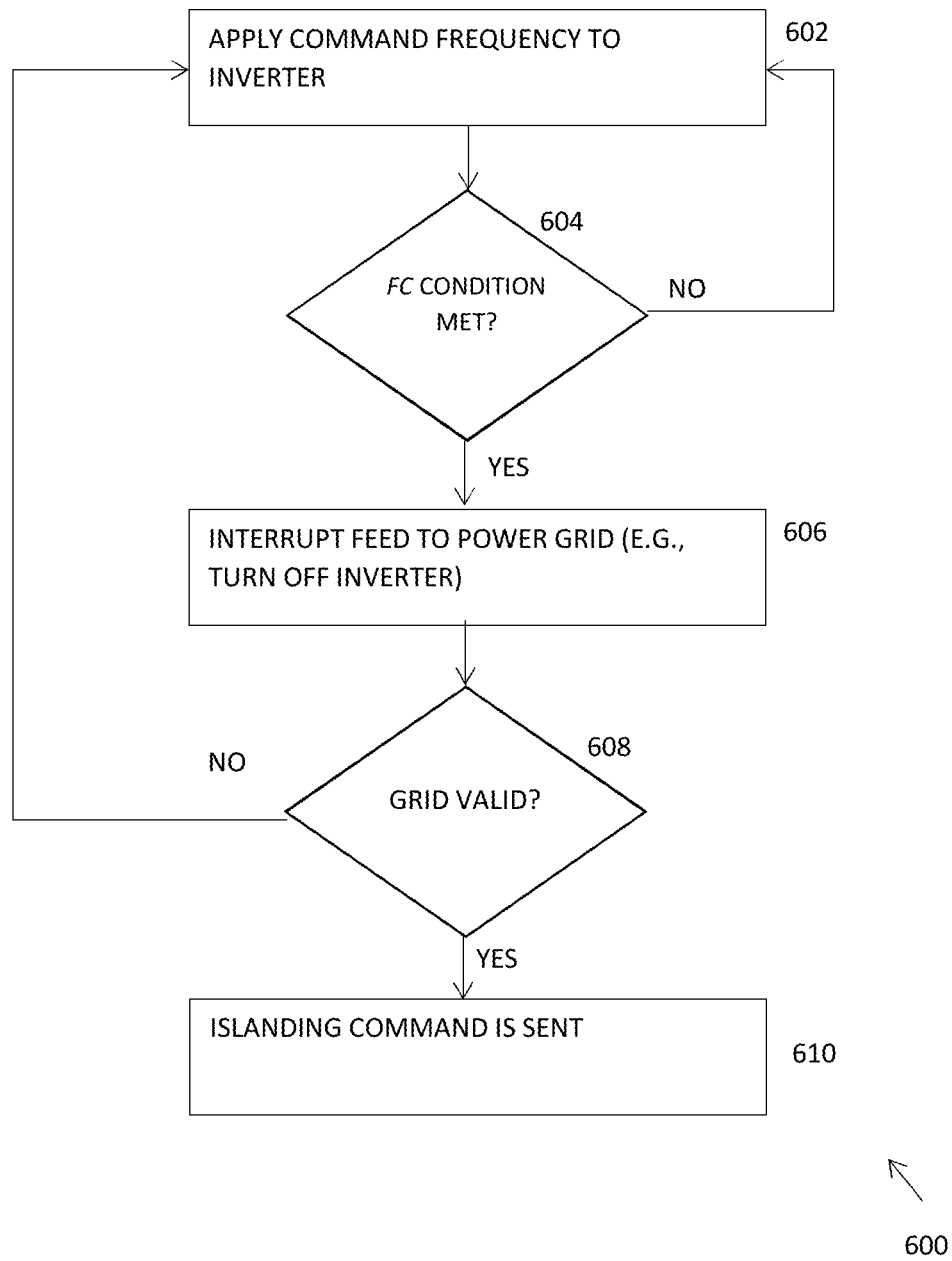
FIG. 6 illustrates a method of islanding detection and prevention in accordance with an example embodiment.

FIG. 6 shows an exemplary general flowchart of a method 600 that may be executed by a controller to determine if an islanding condition is occurring or has occurred in accordance to one example embodiment. In block 602, the controller, or other suitable component, may send a command to an inverter connected to a power source, such as those described in FIGS. 2-5. The inverter may be coupled to a power grid and may provide power from the power source to the power grid. The command applies a command frequency to a waveform output by the inverter. In various examples, the command frequency may be determined, for example, as described herein with respect to Equations [1]-[3]. The waveform may be a current waveform, a voltage waveform, or a phase of the current or voltage waveform applied by the inverter to the power grid. For example the waveform may be the waveform 307 described herein.

At block 604, the controller may determine whether the command frequency meets one or more conditions suggesting that a tank and/or islanding condition is present. These conditions may include those described herein including, for example, when the command frequency variation is locked or constant for a threshold amount of time (e.g., 1.5-1.7 seconds), when a change in the command frequency is non-zero, etc. Examples of the one or more conditions are described herein. If the one or more conditions are met, then controller may, at block 606, instruct the inverter to disconnect the power supply from the grid. This may be accomplished by switching the inverter to an off state or disconnecting the inverter, and the hence the power source, from the power grid.

At 608, the controller may determine is made whether the grid is valid (e.g., whether a main power source is active). Accordingly, the voltage and/or current of the power grid may be measured to determine if an islanding condition has occurred. If the grid is not valid, it may indicate that an islanding condition is present. If the grid is not valid (e.g., an islanding condition is detected), an islanding command may be sent at block 610 to an inverter or inverters of the distributed generation source to disconnect the distributed generation source from the grid. If an islanding condition is not detected, the power supplied by the inverter from the power source to the power grid is reconnected. According to example embodiments, this is automated process performed by the control circuit of the power source. In various examples, the method 600 may be executed within the period during which a distributed generation unit is required to detect an islanding condition by applicable regulations. In some examples, described above, this period is two (2) seconds. In some examples, the length of time necessary to execute the process flow 600 may be tuned by changing various factors such as, for example, the threshold time for determining a locked command frequency variation, etc. In some examples, the method 600 may be utilized in conjunction with an over/under frequency protection circuit (OFP/UFP) that compares the command frequency to a set of threshold frequencies for the grid (e.g., ($59.3<f_c<60.5$)). When the command frequency falls outside the thresholds, the controller may detect an islanding condition and disconnect the distributed generator from the grid. The OFP/UFP, however, may not detect island conditions when the load and power on the grid are closely matched. In these situations, the method 600, executed by the controller, may detect island conditions as described herein.

Figure 7:
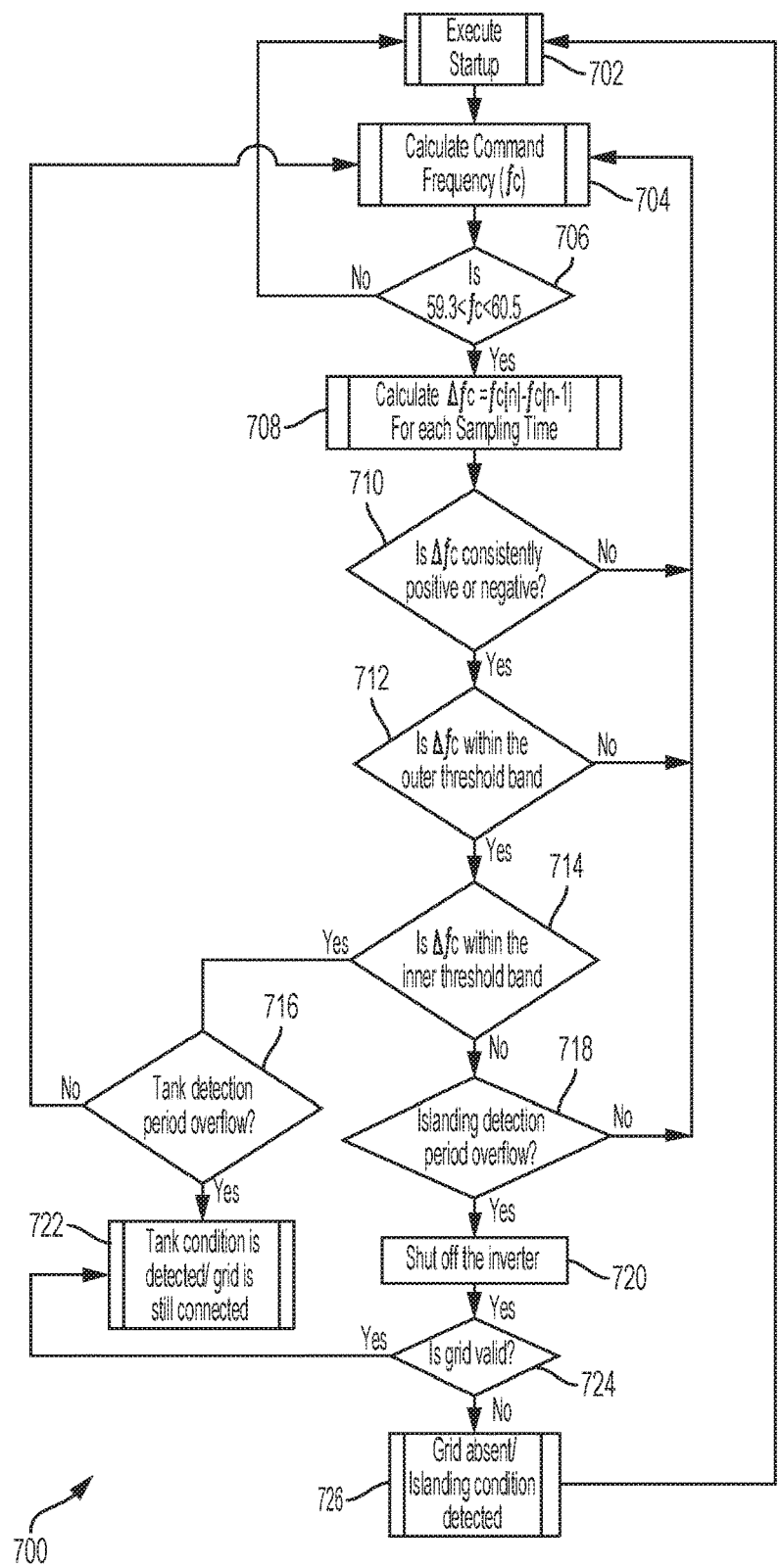
FIG. 7 illustrates a method of islanding detection and prevention in accordance with another example embodiment.

FIG. 7 illustrates a method 700 showing another example embodiment for islanding detection and prevention. At 702, the controller may execute a startup routine. According to example embodiments, the controller may be the same or similar to the controller 202 referred to in FIG. 2. According to the start-up routine, the power source may make preparations to provide power to the grid. At block 704, the controller may calculate the command frequency, for example, as described below. In some examples, a filtered frequency may be found by filtering the sampled grid frequency. Any suitable filter may be used including, for example, an infinite impulse response (IIR) filter or other suitable digital filter. An example for finding (F[n]) using an IIR digital filter is shown in Equation [1] below:

$$F[n] = \frac{K-1}{K} F[n-1] + \frac{1}{K} f[n] \quad [1]$$

In Equation [1], F[n] is the filtered frequency, F[n−1] is the filtered frequency calculated at the previous sample (e.g., n−1), f[n] is the grid frequency, and K>1 is an integer chosen based on a desired system response time. A deviation of frequency $\varepsilon_f[n]$ may describe a difference between the grid frequency and the filtered frequency. An example equation for finding the deviation of frequency is provided by Equation [2] below:

$$\varepsilon_f[n] = f[n] - F[n] \quad [2]$$

The command frequency $f_c[n]$ of the inverter may be found considering $\varepsilon_f[n]$ as shown by Equation [3] below:

$$f_c[n] = +F[n] + \alpha \varepsilon_f[n] \quad [3]$$

In Equation [3], α may be a constant integer, typically, greater than 1 and may be used to determine the rate at which the command frequency is adjusted. In some examples, α may represent the disturbance added to the command frequency, as described herein. For example, α may be a constant, a polynomial signal, a linear signal, a noise signal, etc. Also, although the command frequency is shown to be calculated in terms of the difference between the filter frequency and the grid frequency (e.g., $\varepsilon_f[n]$), any suitable random or controlled noise may be used in place of $\varepsilon_f[n]$.

The command frequency may vary, for example, if the load is not matched with the generating power in such a way that the command frequency is increased if the load is greater than the generating capacity and is decreased if the load is less than the generating capacity. Consequently, using an over/under frequency protection circuit (OFP/UFP) with setting some threshold limit (59.3<$f_g$<60.5) islanding can be detected when the frequency exceeds the limit. For example, an over/under frequency protection circuit may be used in addition to the process flows described herein. The OFP/UFP may detect islanding conditions that occur when there is not a match between the load and the generating power. The OFP/UFP, however, may have a non-detection zone in a stable grid when the load exactly or closely matches the generating capacity. Such a non-detection zone may be described by Equations [4]-[6] below:

$$f[n] = f[n-1], \; F[n] = F[n-1] \quad [4]$$

$$F[n] = f[n], \; \varepsilon_f[n] = 0 \quad [5]$$

$$f_c[n] = f_c[n-1] \quad [6]$$

When the grid frequency is stable due to the load-generator capacity match, the command frequency of the inverter also remains constant and the variation of the command frequency is zero. When the grid frequency is stable, but has some small deviation from the rated frequency, it may indicate that an island condition is possible but may or may not exist, as described herein. Such a condition may occur, for example, when the grid is operating with 60.1 Hz while the rated frequency is 60 Hz. Likewise, for an unstable grid, $f_c[n] \neq f_c[n-1]$, or in other words, the frequency command of the inverter varies if the grid frequency is unstable. When islanding happens, the command frequency variation, $\Delta f_c$, may be locked in a value because it has lost frequency information from the grid. After passing a few cycles in this mode with observing the locked command frequency, grid disconnection can be verified, and the final islanding command will be sent and the system will forego reconnecting the power source to the grid, as described herein.

Referring back to FIG. 7, once the command frequency is calculated, at block 706 the command frequency is compared to an initial frequency range to determine if it is within that range. For example, if the command frequency is outside of the rated range of the grid (e.g., 59.3 Hz-60.5 Hz), it may not be applied to the inverter and therefore the grid. Instead, the controller may return to startup at block 702 where the power source and inverter remain disconnected from the power grid. The values 59.3 Hz and 60.5 Hz are chosen based on the standard for the frequency variation allowed for power systems in the United States. Other ranges of frequencies may be chosen as appropriate, for example based on other countries and/or load setting, such industrial versus residential. If the command frequency does fall within the initial range, then the command frequency may be applied to the inverter and the distributed generation source connected to the grid. A value, $\Delta f_c$, may be calculated at block 708, for example, as described herein above with respect to Equations [1]-[3]. The controller may calculate $\Delta f_c$ as $f_c[n] - f_c[n-1]$ for each sampling time. Upon calculating $\Delta f_c$, at block 710, the controller may determine whether $\Delta f_c$ is consistently positive or negative. For example $\Delta f_c$ may be considered to be consistently positive if it is above zero for a threshold time and/or a threshold number of samples. Similarly, $\Delta f_c$ may be considered consistently negative if it is below zero for a threshold time and/or for a threshold number of samples.

If the controller determines that $\Delta f_c$ is not consistently positive or negative, for example, if it is alternating in polarity, then the controller may return to 704 and continue to calculate the command frequency. If the controller determines that $\Delta f_c$ is consistently positive or negative, this may used as a proxy for the $\Delta f_c$ being zero (applying a hysteresis band around zero). The controller may proceed to 712. At 712, the controller may determine whether $\Delta f_c$ is within an outer threshold band at step 712. Any suitable outer threshold band may be chosen including, for example, 0.5 Hz. If $\Delta f_c$ is not within the outer threshold band, the controller may again return to 704 and continue to calculate the command frequency. If $\Delta f_c$ is within the outer threshold limit in block 712, then, at block 714, the controller may determine whether $\Delta f_c$ is within an inner threshold band in block 714. Any suitable inner threshold band may be chosen including, for example, 0.2 Hz. If the controller determines that $\Delta f_c$ is not within an inner threshold limit in block 714, the controller may return to 704 and continue to calculate the command frequency. If the controller determines that $\Delta f_c$ is within an inner threshold limit in block 714, the controller may determine whether the islanding detection period is in overflow at block 718. If the islanding detection period is not in overflow, then the controller may return to 704 and continue to calculate the command frequency. If the islanding detection is in overflow (e.g., more than an islanding detection period has passed), the inverter may be disconnected from the grid at block 720. The controller may determine at 724 whether the grid is valid. This can be determined based on whether the grid is providing a current or voltage from a main power source that is normally feeding the grid. The main power source may be a power source that is provided by a utility, an electric cooperative, or any other entity as appropriate and as described herein. If the grid is determined not to be valid at 724, then it is determined that an islanding condition has occurred and the grid is absent from the connection with the inverter.

Referring again to 714, if $\Delta f_c$ is within both the inner and outer threshold bands, the controller may determine at block 716 whether a tank detection period overflow has occurred (e.g., whether a tank detection period has passed since start-up). If yes, the controller may proceed to a tank condition/no islanding state at 722. In some examples, performing the tests on the command frequency demonstrated in FIG. 7 may allow the controller to differentiate between islanding conditions and other situations where the $\Delta f_c$ is constant. This may eliminate unnecessary disconnections of the inverter, which can disrupt power. In some examples, a "tank" condition, as described herein, may occur when the command frequency is considered to be constant, nonzero value, but it may some small deviation from the rated frequency, which is shown in FIG. 7 as being between 59.3 Hz and 60.5 Hz. For example, when the grid is operating with 60.1 Hz while the rated frequency is 60 Hz, the system may determine tank has happened. Likewise, for an unstable grid, $f_c[n] \neq f_c[n-1]$ or, in other words, the frequency command of the inverter varies if the grid frequency is unstable. When islanding happens, the frequency command variation may be (a) locked at a value because it has lost the frequency information from the grid.

Figure 8:
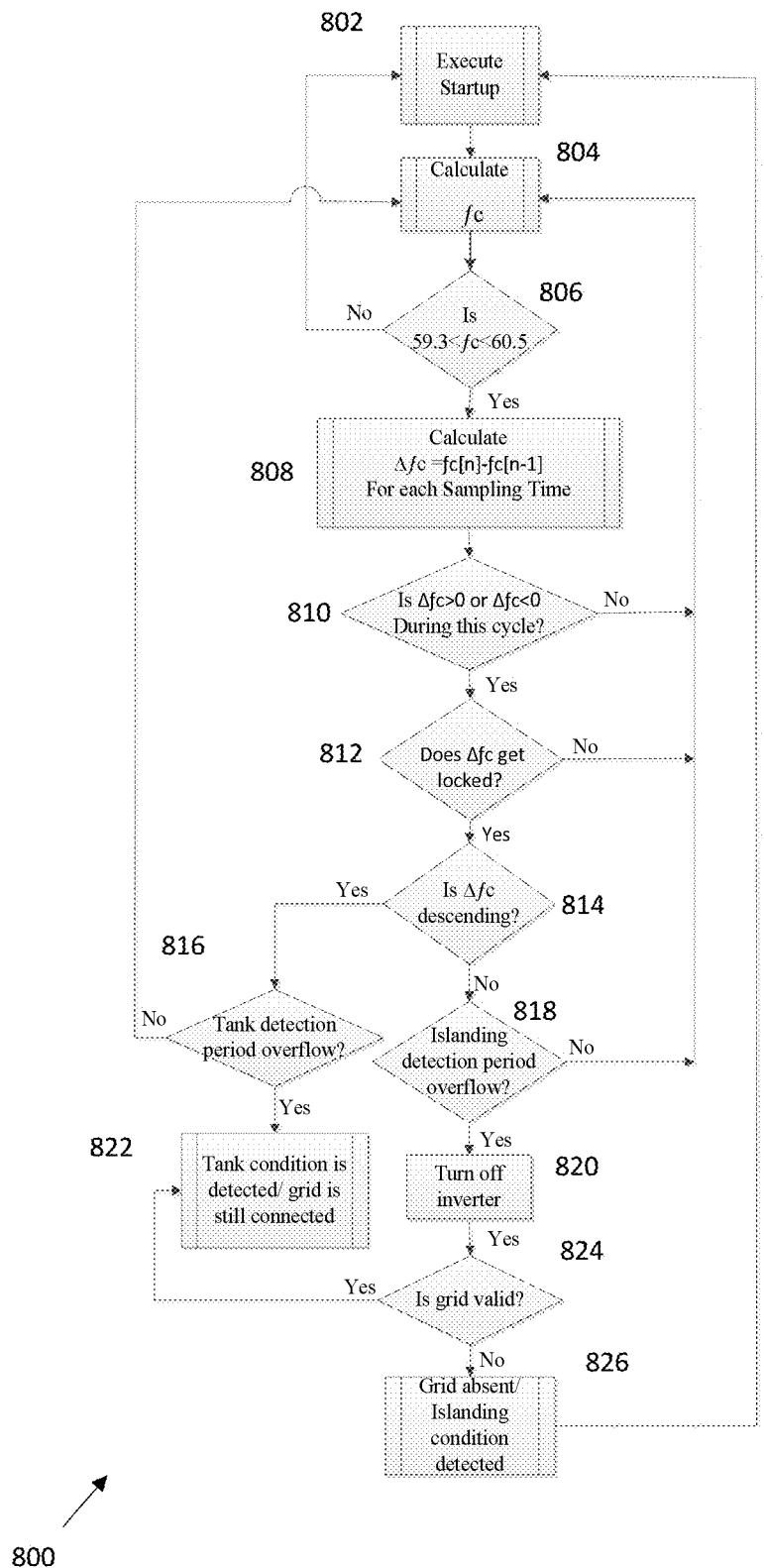
FIG. 8 illustrates a method of islanding detection and prevention in accordance with another example embodiment.

FIG. 8 illustrates a method 800 of islanding detection and prevention in accordance with another example embodiment. Method 800 starts where the controller may execute a startup routine at 802. According to the start-up routine, the power source may make preparations to provide power to the grid. At block 804, the controller may calculate the command frequency, for example, as discussed above with regard to FIG. 7. Once the command frequency is calculated, at block 806 the command frequency is compared to an initial range to determine if it is within that range.

As shown in FIG. 8, a comparison is made to determine if the command frequency is between 59.3 Hz and 60.5 Hz. For example, if the command frequency is outside of the rated range of the grid (e.g., 59.3 Hz-60.5 Hz), it may not be applied to the inverter and therefore the grid. Instead, the controller may return to startup at block 802 where the power source and inverter remain disconnected from the power grid. The values 59.3 Hz and 60.5 Hz are chosen based on the standard for the frequency variation allowed for power systems in the United States. Other ranges of frequencies may be chosen as appropriate, for example based on other countries and/or load setting, such industrial versus residential. If the command frequency does fall within the initial range, then the command frequency may be applied to the inverter and the distributed generation source is connected to the grid. A value of the command frequency variation, $\Delta f_c$, may be calculated at block 808, for example, as described herein above with respect to Equations [1]-[3]. The controller may calculate $\Delta f_c$ as $f_c[n]-f_c[n-1]$ for each sampling time. Upon calculating $\Delta f_c$ at block 810, the controller may determine whether $\Delta f_c$ is greater than or less than 0 for a threshold time, for example one or more cycles (1 Hz), and/or a threshold number of samples. If the controller determines that $\Delta f_c$ is not greater than or less than 0, then the controller may return to 804 and continue to calculate the command frequency. If the controller determines that $\Delta f_c$ is greater than or less than 0, and hence not zero, the controller may proceed to block 812. At block 812, the controller determines whether $\Delta f_c$ has been locked in a value. For example, $\Delta f_c$ may be locked if it remains constant for a threshold time or number of cycles. In some examples, the threshold may be 1.5 seconds. If the controller determines that $\Delta f_c$ is not locked in a value, then the controller may again return to 804 and continue to calculate the command frequency. If the controller determines that $\Delta f_c$ is locked in value, then the controller proceeds to block 814 and determines whether $\Delta f_c$ is descending in value.

If at 814, $\Delta f_c$ is not determined to have a descending value, the controller may determine whether the islanding detection period is in overflow at block 818 (e.g., whether the islanding detection period has elapsed since startup). If the islanding detection period is not in overflow, then the controller may return to 804 and continue to calculate the command frequency. If the islanding detection is in overflow (e.g., more than an islanding detection period has passed), the inverter may be disconnected from the grid at block 820. The controller may determine at 824 whether the grid is valid. This can be determined based on whether the grid is providing a current or voltage from a main power source that is normally feeding the grid. The main power source may be a power source that is provided by a utility, an electric cooperative, or any other entity as appropriate and as described herein. If the grid is determined not to be valid at 824, then it is determined that an islanding condition has occurred and the grid is absent from the connection with the inverter.

Referring again to 814, if $\Delta f_c$ is descending, the controller may determine at block 816 whether a tank detection period overflow has occurred (e.g., whether a tank detection period has passed since start-up). If yes, the controller may proceed to a tank condition/no islanding state at 822. If the controller determines that the a tank detection period overflow has not occurred. In some examples, the controller may again return to 804 and continue to calculate the command frequency. According to the example embodiment shown in FIG. 8, if a tank condition is detected by the controller and the controller determines that the grid is still connected, the method ends. In another example embodiment, if a tank condition is detected by the controller, the inverter is turned off and the controller determines whether the grid is valid. In the event that the grid is determined not to be valid, an islanding condition is detected and the power source connected to the inverter is removed from the grid. In one example embodiment, after passing a threshold time, such as 3-5 cycles in the mode where a locked frequency band is observed by the controller, the controller determines that the grid is disconnected and the inverter is shut off and a final islanding command is sent.

Performing the tests on the command frequency demonstrated in FIG. 8 may allow the controller to differentiate between islanding conditions and other situations where the $\Delta f_c$ is constant. This may eliminate unnecessary disconnections of the inverter, which can disrupt power. In some examples, a "tank" condition, as described herein, may occur when the command frequency is considered to be constant, nonzero value, but it may some small deviation from the rated frequency, which is shown in FIG. 8 as being between 59.3 Hz and 60.5 Hz. For example, when the grid is operating with 60.1 Hz while the rated frequency is 60 Hz, the system may determine tank has happened. Likewise, for an unstable grid, $f_c[n] \neq f_c[n-1]$ or, in other words, the frequency command of the inverter varies if the grid frequency is unstable. When islanding happens, the frequency command variation may be (a) locked at a value because it has lost the frequency information from the grid.

Advantageous features of example embodiments of the present disclosure include: (1) capability of islanding detection by just adding a disturbance in the inverter frequency, as described herein, without adding any disturbance to other parameters such as voltage/current; and (2) without negative impact on the power quality, or efficiency of the system.

Figure 9:
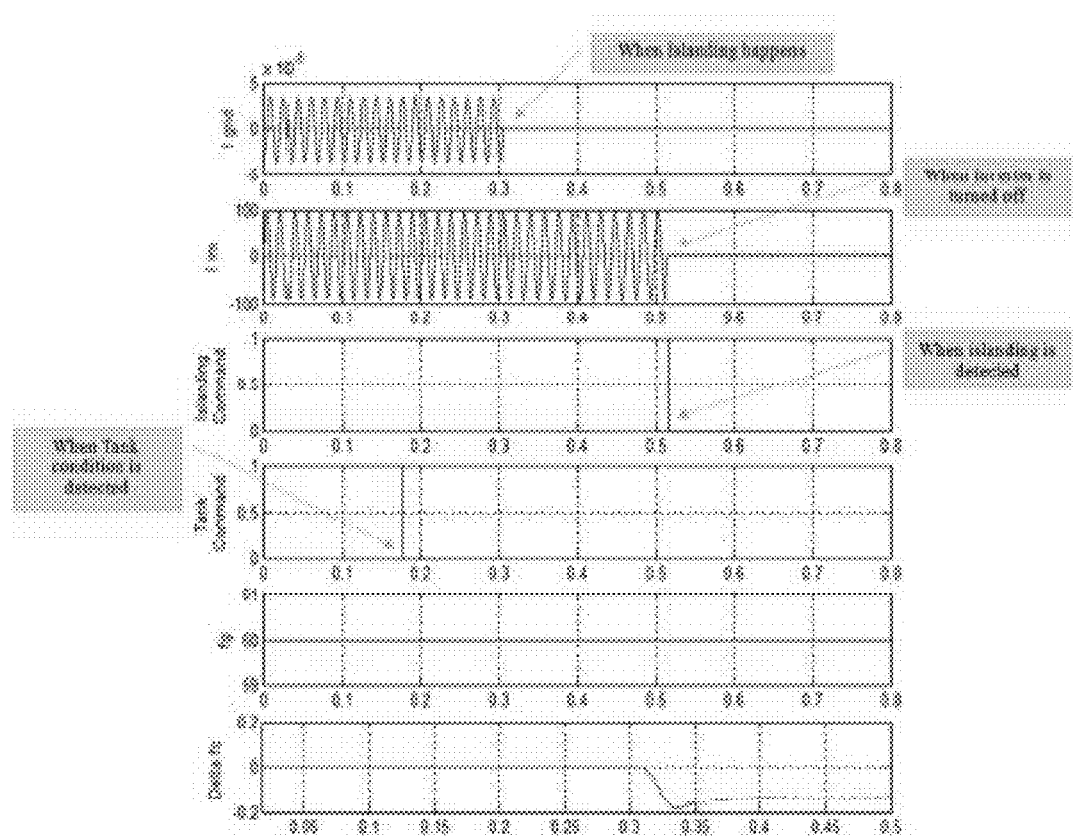
FIGS. 9-12 display graphs of measurement results for islanding detection and prevention in accordance with an example embodiment.

FIGS. 9-12 present software simulation information regarding example embodiments of the algorithm presented herein and various scenarios in which they are applied. As shown in FIG. 9, a tank condition has occurred starting at time 0s, because Delta $f_c$=0, and has been detected by the system at almost time 0 s. An islanding condition occurred at time 0.3 s and because the tank condition was detected, and the inverters were turned off at time 0.5 sec. The current from the grid was measured following the time that the inverters were turned off and because the grid current was measured to be 0 A, an islanding condition was detected just after 0.5 sec. Thus, after 0.5 sec, the power source is disconnected from the grid.

Figure 10:
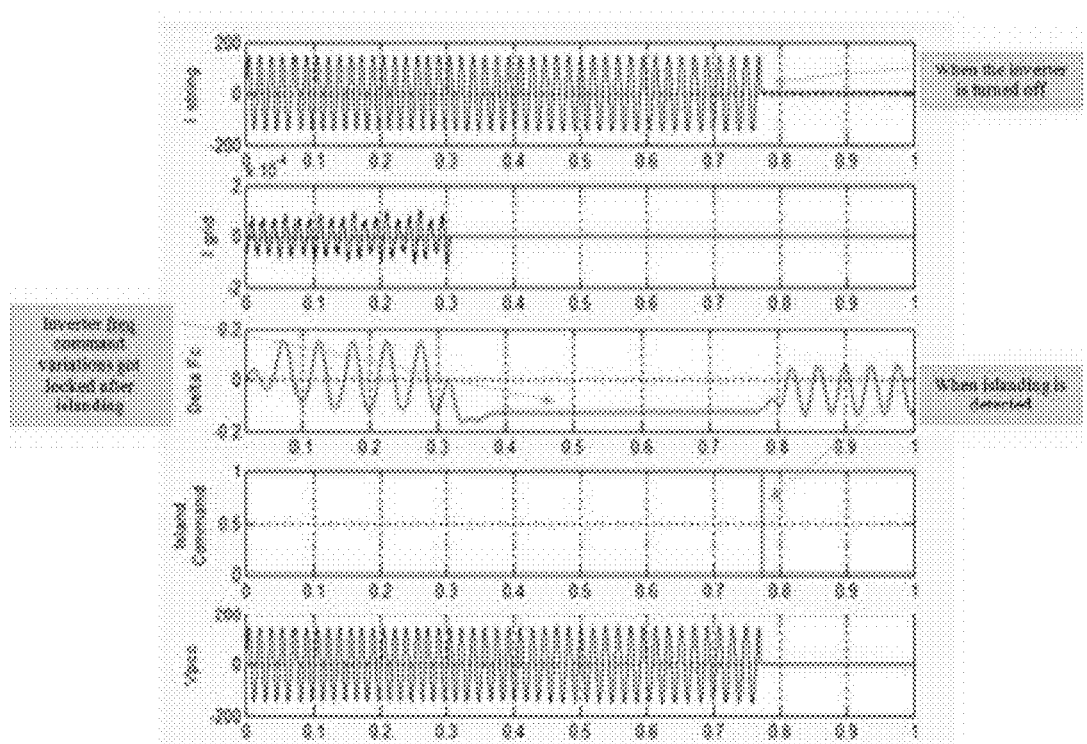

As shown in FIG. 10, islanding had occurred at 0.3 sec and the command frequency variation, $\Delta f_c$, was constant, which is shown around −0.15, for a threshold time period. The inverter frequency was then turned off at 0.75 sec and the measured grid current is 0 A. Thus, an islanding condition was detected at 0.75 sec and the power source was disconnected from the grid. As shown in FIG. 10, while the inverter frequency command frequency was varied, the voltage of the power source, measured by the voltage at the point of common coupling (shown as $V_{pcc}$), was not varied. Thus, only the command frequency of the inverter was changed.

Figure 11:
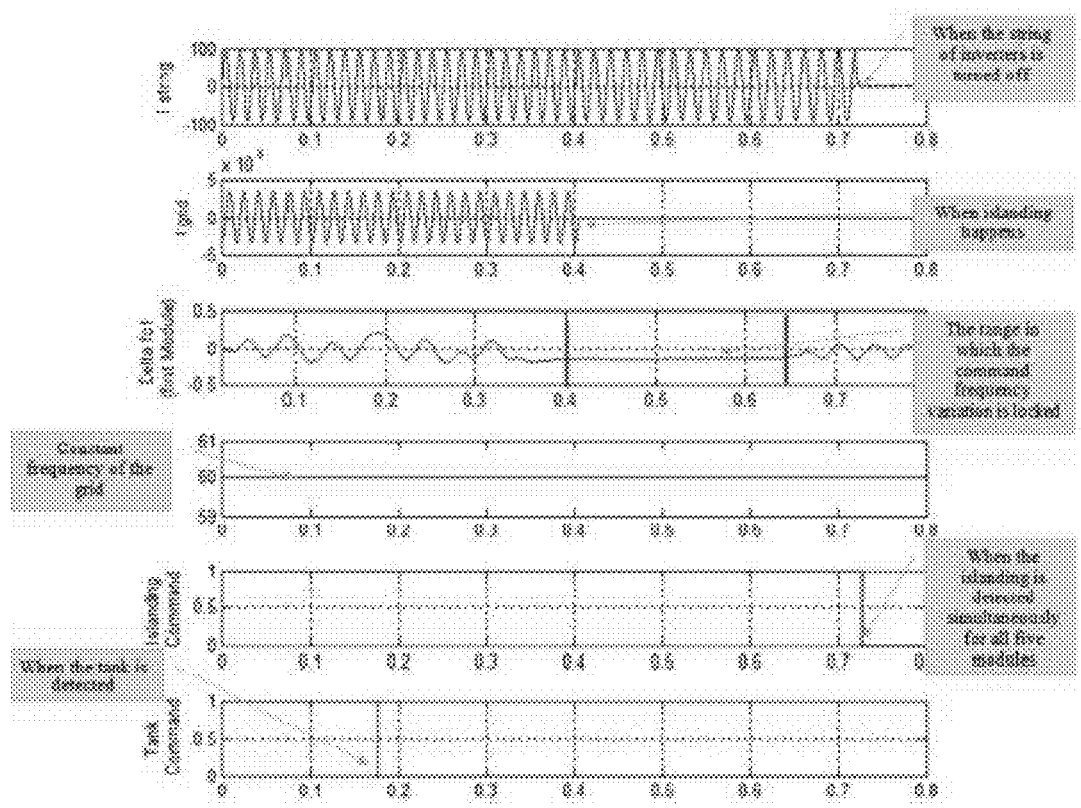

In FIG. 11, as shown, the grid frequency was constant and a tank condition was detected at about 0.2 sec. The change in the command frequency, a, was constant (e.g., locked) from 0.4 to 0.65 s, and an islanding condition occurred at 0.4 sec. The inverter was turned off at 0.7 s and because the measured current of the grid is 0 A, the system detects that an islanding condition has occurred and disconnects the power source from the grid.

Figure 12:
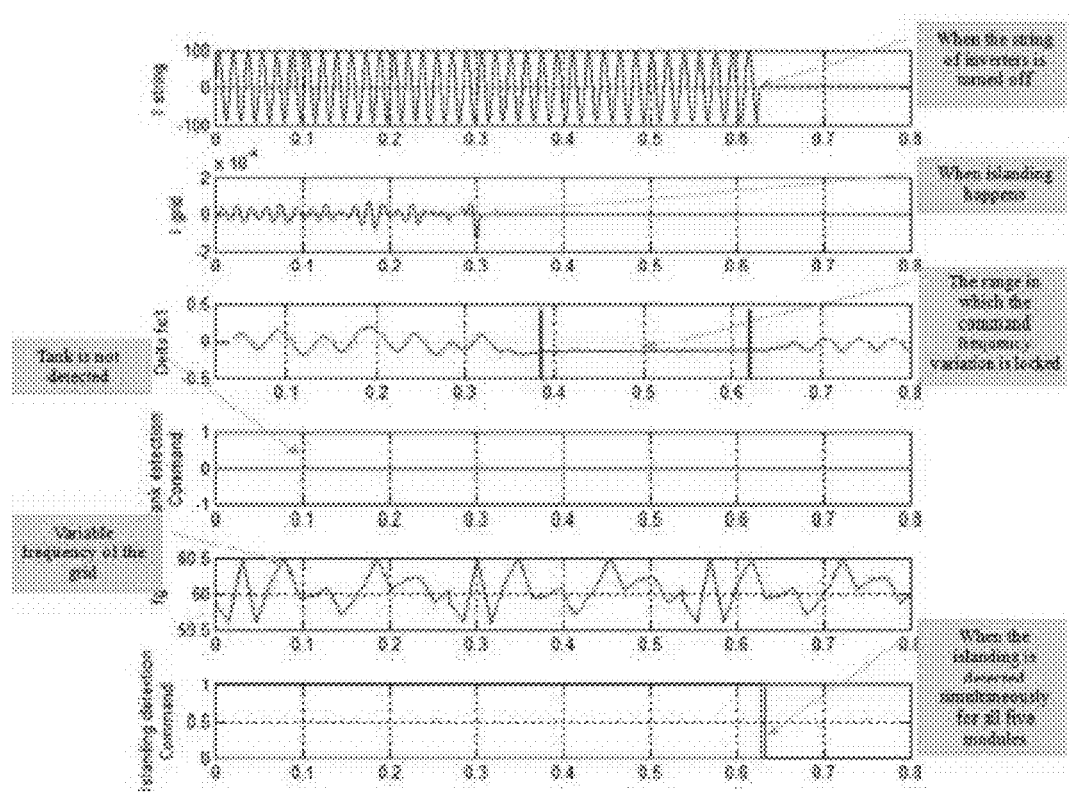

In FIG. 12, it is supposed that the utility frequency varies within the acceptable range ($59.3 < f_g < 60.5$). To model the frequency variation, the real-time data set of grid frequency in the lab has been used. Accelerating coefficient, α (See Equation [3]) is set to 4.5, and K=2 (See Equation [1]). It should be noted that with increasing α, the required time to detect islanding will be increased as the contribution of error in equation will be magnified causing bigger variations in the command frequency. The threshold to command frequency variation lock is set to be 1 mHz ($\varepsilon_f[n]$=0.001 Hz), and based on the IEEE 1547 standard, it may be necessary for algorithm to detect islanding in less than 2 seconds (in one example embodiment).

As shown in FIG. 12, the frequency of the inverters are commanded to be varied from time 0-0.8 s but the $\Delta f_c$ becomes locked or constant starting at 0.4 s. At 0.62 s, the inverters are turned off and because the measured grid current, $I_{grid}$, is 0 A, an islanding condition has been detected at 0.62 s and the islanding detection command is provided.

Figure 13:
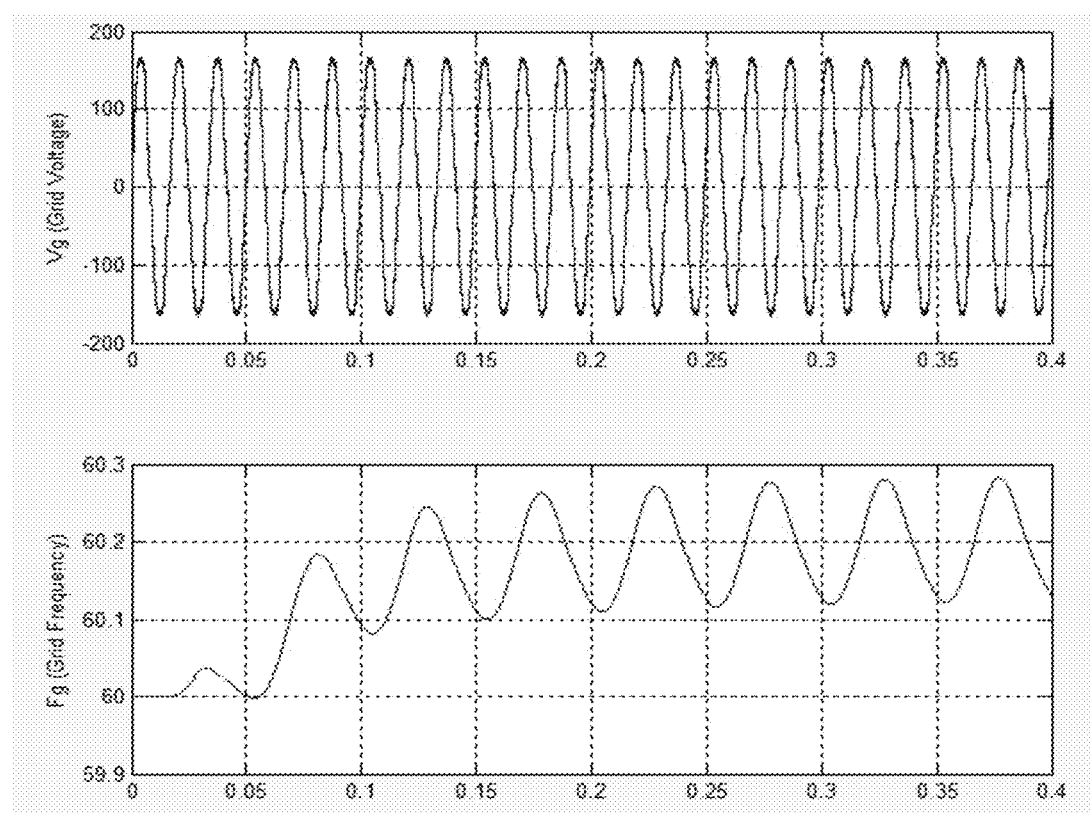
FIGS. 13-22 display graphs of measurement results for islanding detection and prevention in accordance with additional example embodiments.
Figure 14:
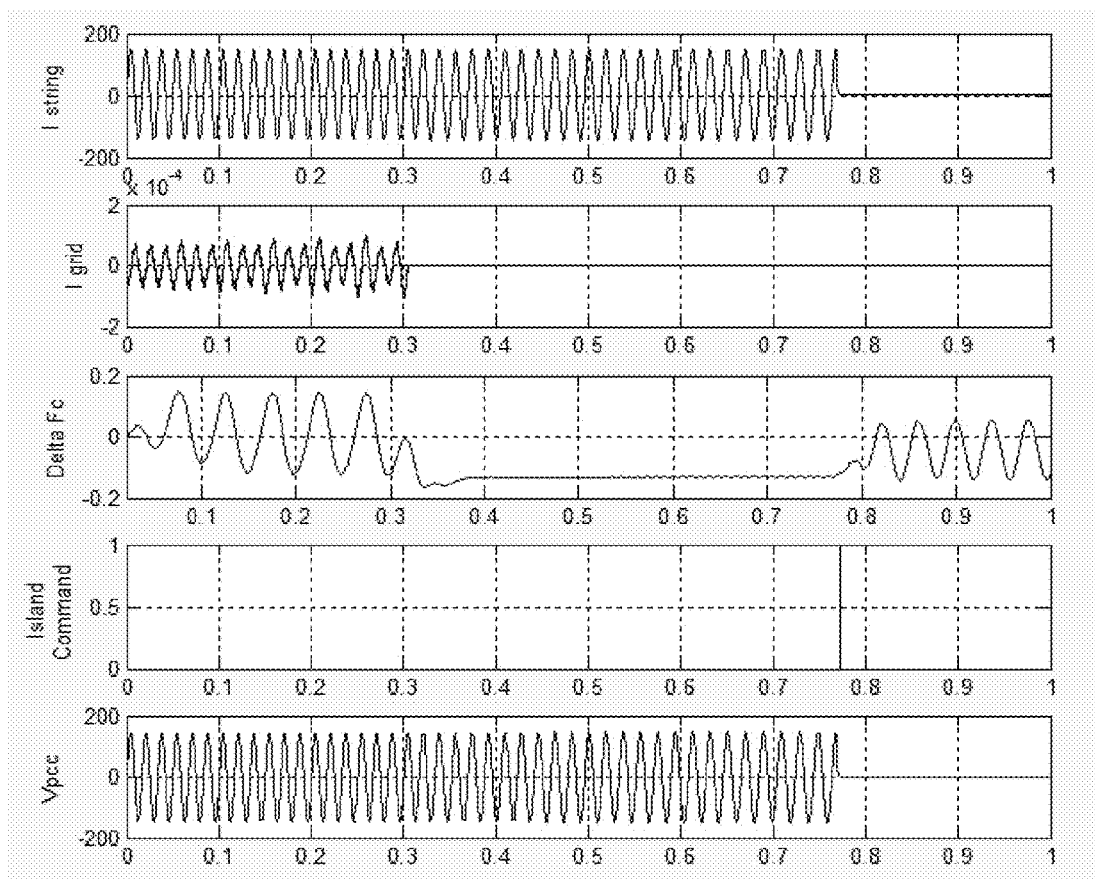

FIGS. 13 and 14 show simulation results when a quality factor, which is relied on as a figure of merit for the load of the power grid, is <2, and the grid voltage is used. As seen in FIG. 14, the load matches closely to the generating power resulting in very small current in the grid. The grid frequency is oscillating around 60.2 Hz with the small ripple less than 0.1 Hz. As shown in FIG. 14, after islanding happens in t=0.3 sec, the command frequency variation, $\Delta f_c$, becomes locked, and when the number of cycles in which the command frequency variation is locked exceeds 10, the DG is turned off. The limit defined for the number of cycles to turn off the DG depends on the sampling time and the switching frequency, which may vary. In some examples, the DG may be turned off for ten (10) cycles.

Figure 15:
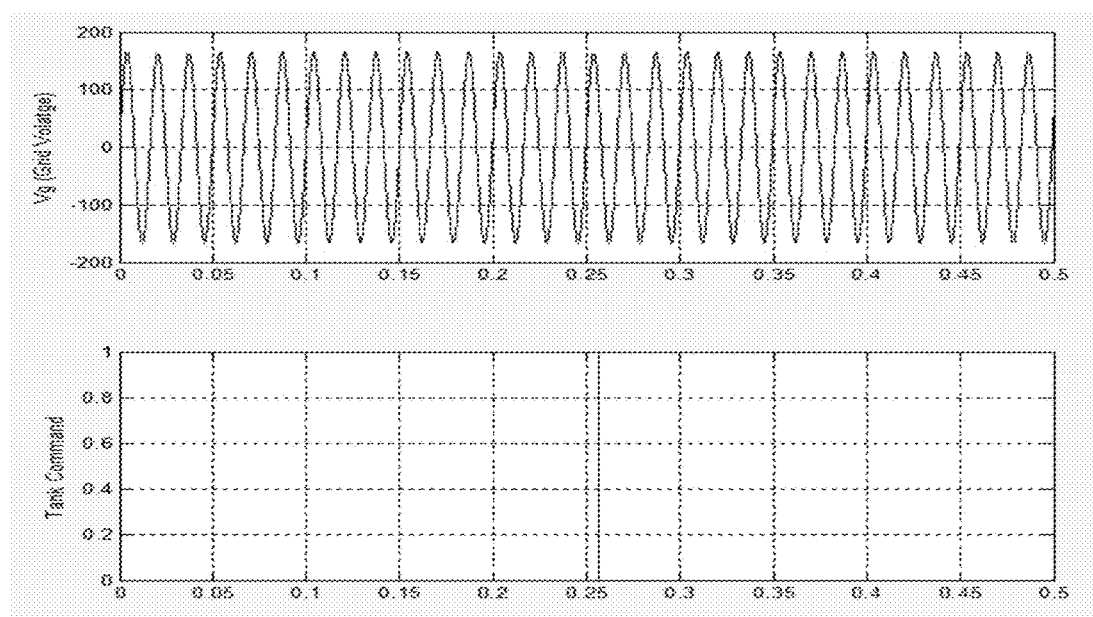
Figure 16:
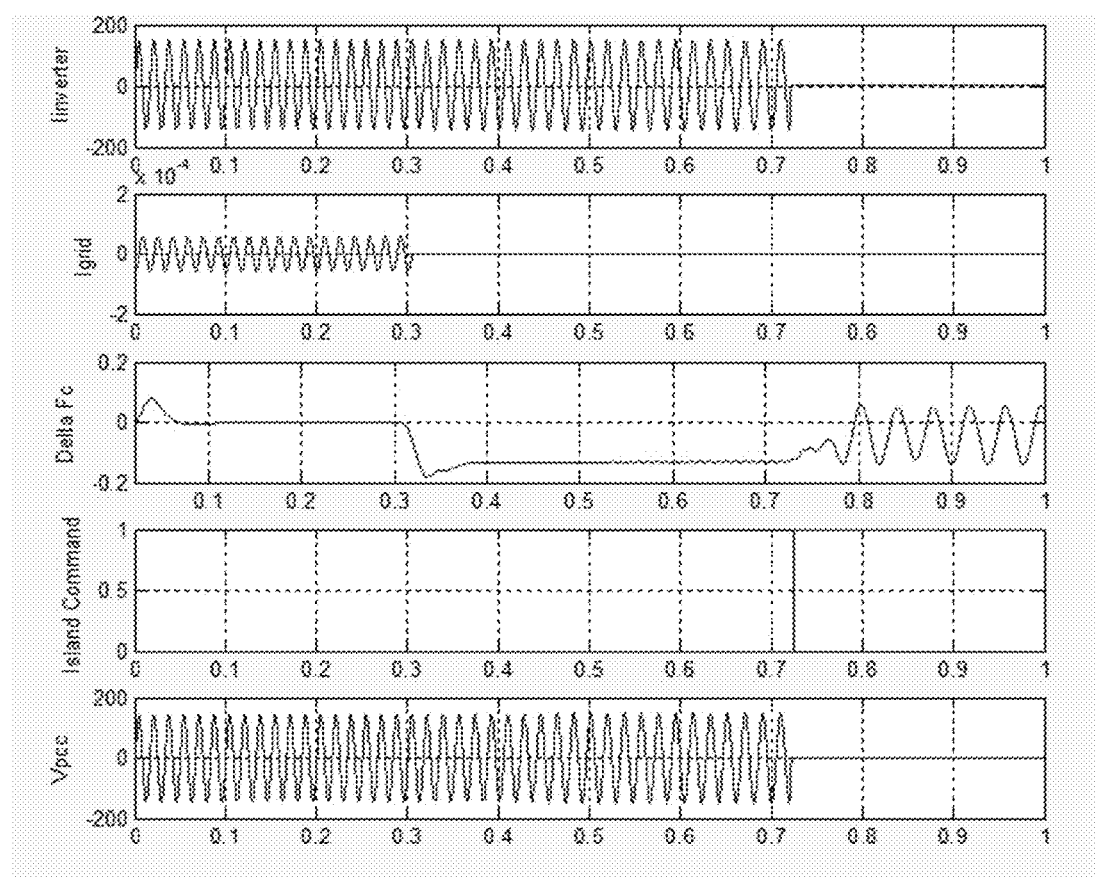

FIG. 15 displays a grid voltage with a constant grid frequency of 60.1 Hz. There is a small tolerance, which is shown as 0.1 Hz, with respect to a rated frequency, shown as 60 Hz. As shown in FIG. 16, before islanding happens at t<0.3 sec, the $\Delta f_c \simeq 0$ and there is a tank condition showing that the grid frequency is stable and it has been kept constant. This condition is detected about 0.25 s as shown in FIG. 15 after initializing the circuit. Also, as an islanding condition happens at t=0.3 sec, this event is also detected around 0.72 sec which is a faster than the previous state with variable grid frequency. Faster detection is the cause of the initial lower oscillation in the grid frequency. An islanding condition can be discriminated with a tank condition when the command frequency variations, $\Delta f_c$, become consistently negative, and the command frequency is still locked. The command frequency oscillation after detecting an islanding condition at t=0.72 sec is not important as the islanding condition has already been detected, and there is no need to determine $\Delta f_c$.

Example embodiments of the present disclosure have the ability to detect over/under voltage (OV/UV) and over/under frequency (OF/UF) conditions for a utility. As described in the UL1741 standard, a voltage trip limit is defined ±10% in less than 2 sec, and a grid frequency trip limit is shown as $59.3 < f_g < 60.5$, within a maximum of 10 cycles of disturbance. To verify the system against these situations, FIGS. 17-20 show the performance of system respectively in 12% over-voltage, and over-frequency happens in t=0.116 sec. As it can be seen in, over-voltage is detected in less than 0.2 sec in FIGS. 17 and 18, and over-frequency is shown around 0.1 sec after occurrence in FIGS. 19 and 20.

Figure 17:
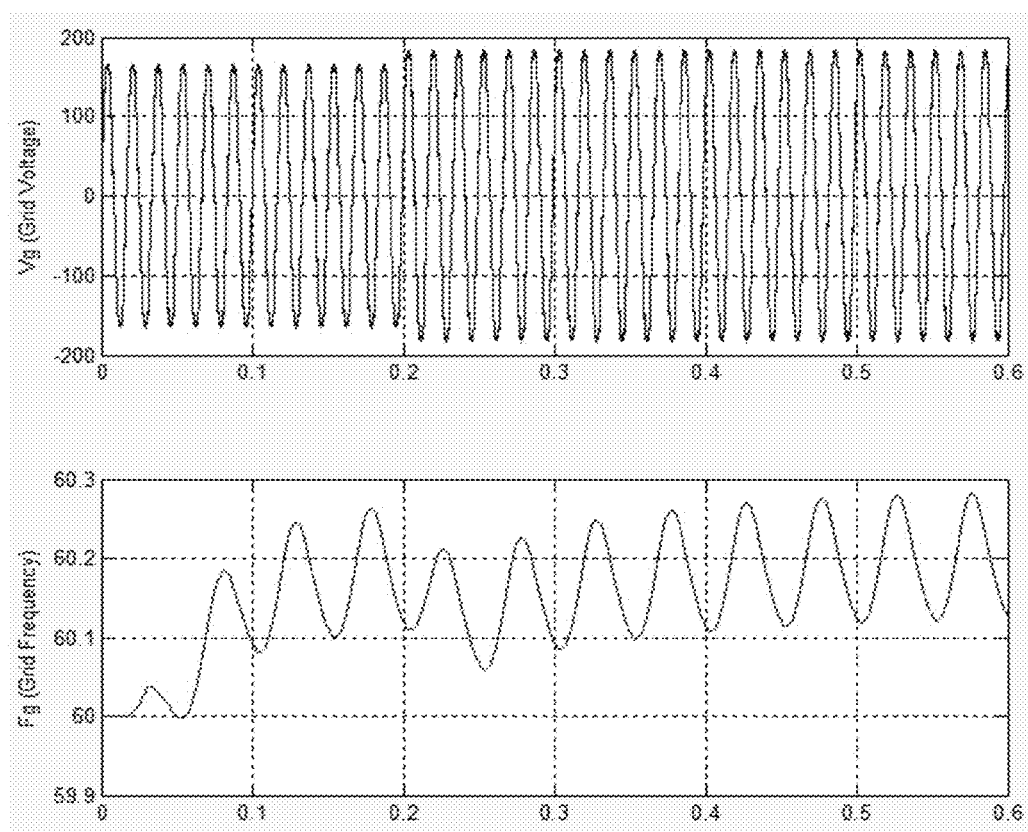
Figure 18:
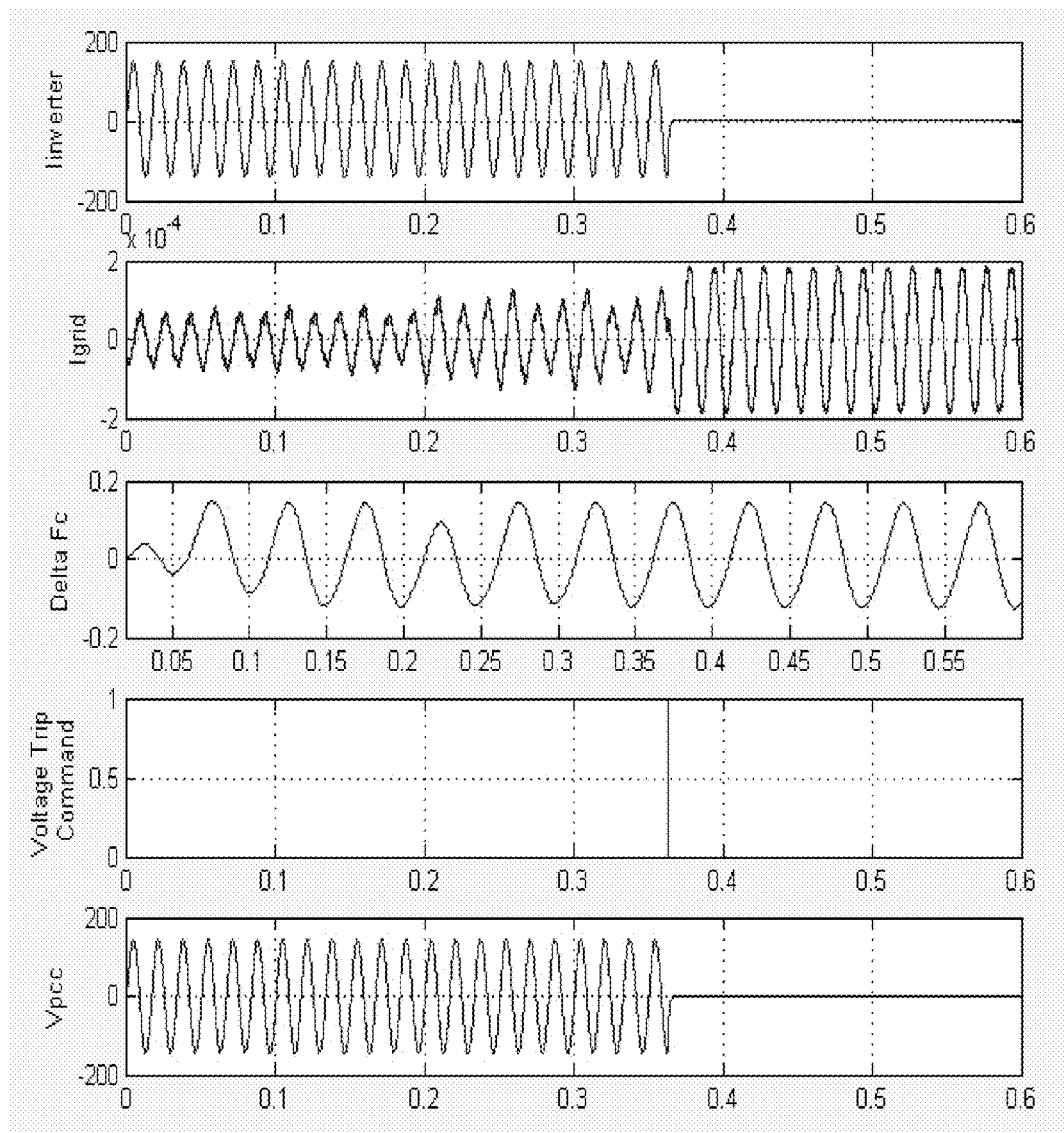
Figure 19:
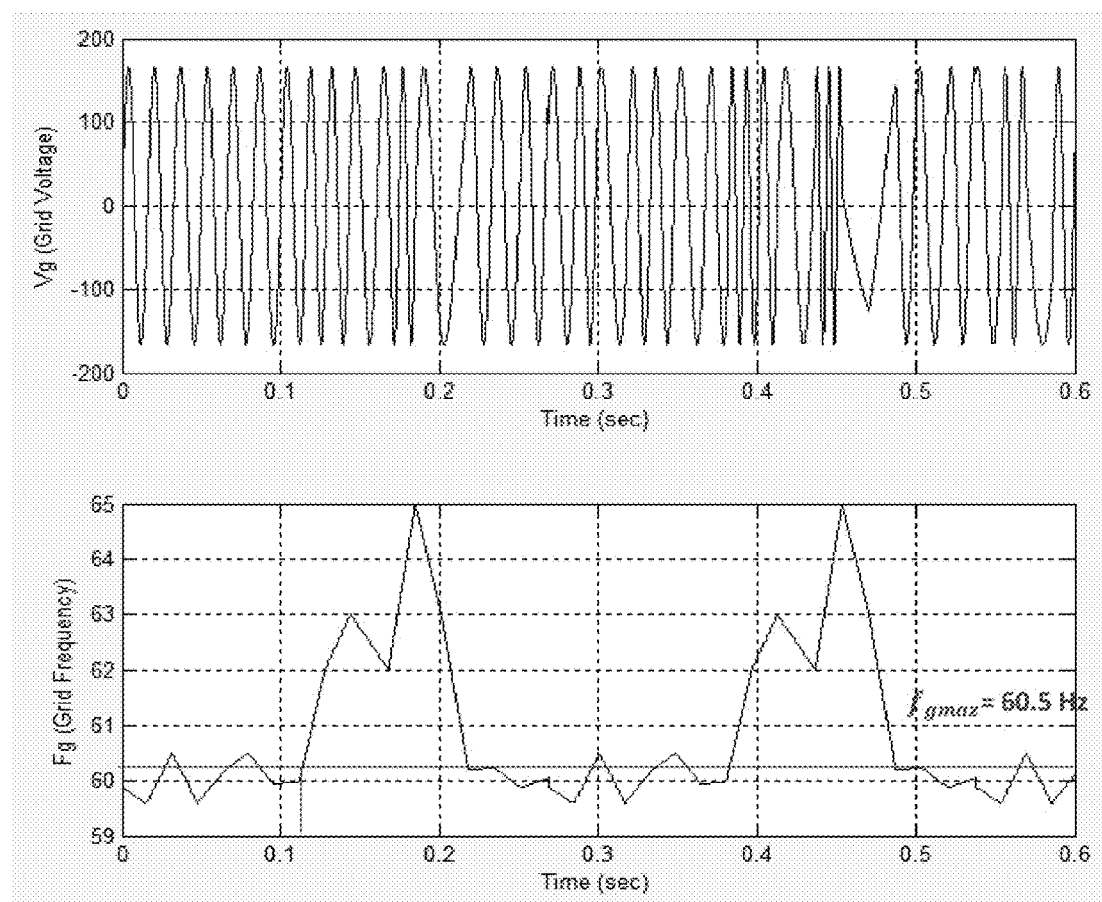
Figure 20:
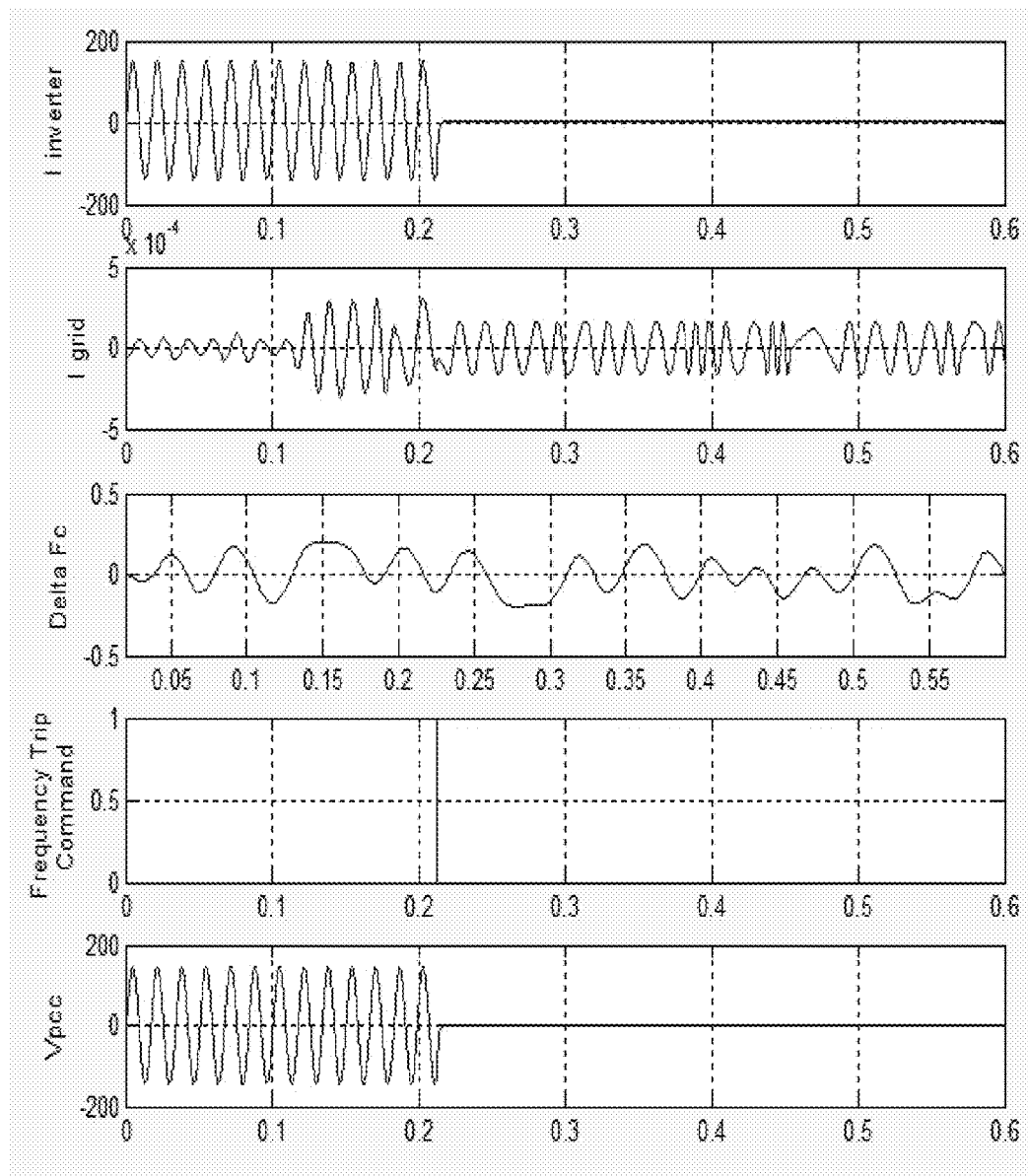

FIG. 17 displays a grid voltage when a 12% over-voltage (OV) happens at t=0.2 sec and FIG. 18 displays results of the grid frequency when over-voltage (OV) happens at t=0.3 sec. As it can be seen in the FIG. 17, the voltage is increased at t=0.2 sec from 110 $V_{rms}$ to 123.2 $V_{rms}$. As expected, the over voltage protection (OVP) control sends the voltage trip command at t=0.37 sec turning off the inverter. The same controller can be used for under voltage protection (UVP) with defining 10% voltage drop as the lower trip off limit. For over/under frequency protection (OFP/UFP) as shown in the FIG. 17, it is assumed that the grid frequency variations exceed the acceptable range $59.3 < f_g < 60.5$. The controller detects frequency violation at t=0.21 sec and then shuts down the DG accordingly. Furthermore, FIG. 19 displays grid voltage specifications when an over-frequency (OF) event happens at t=0.116 sec and FIG. 20 displays simulation results when OF happens at t=0.116 sec, and it is detected in t=0.21 sec.

Figure 21:
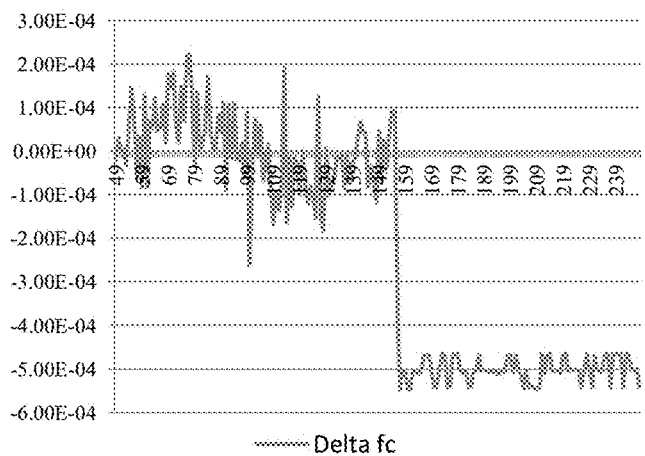

FIG. 21 demonstrates simulation results showing that show a small command frequency variation $\Delta f_c$ regarding the sampled time for an example embodiment of the present disclosure. FIG. 21 shows the real-time hardware in the loop (HIL) results of a grid-tied (110 Vrms, 60 Hz), single phase inverter obtained by Typhoon-HIL 600 emulator in which the proposed algorithm has been applied to detect islanding. The HIL emulator has the ability to define the scaling factor such that the output waveforms can be visible in the screen. In this case, the scaling factor is set to be 40 scaling down the peak of the grid voltage from 155 Vpeak to 3.88 Vpeak as shown in the obtained results.

Figure 22:
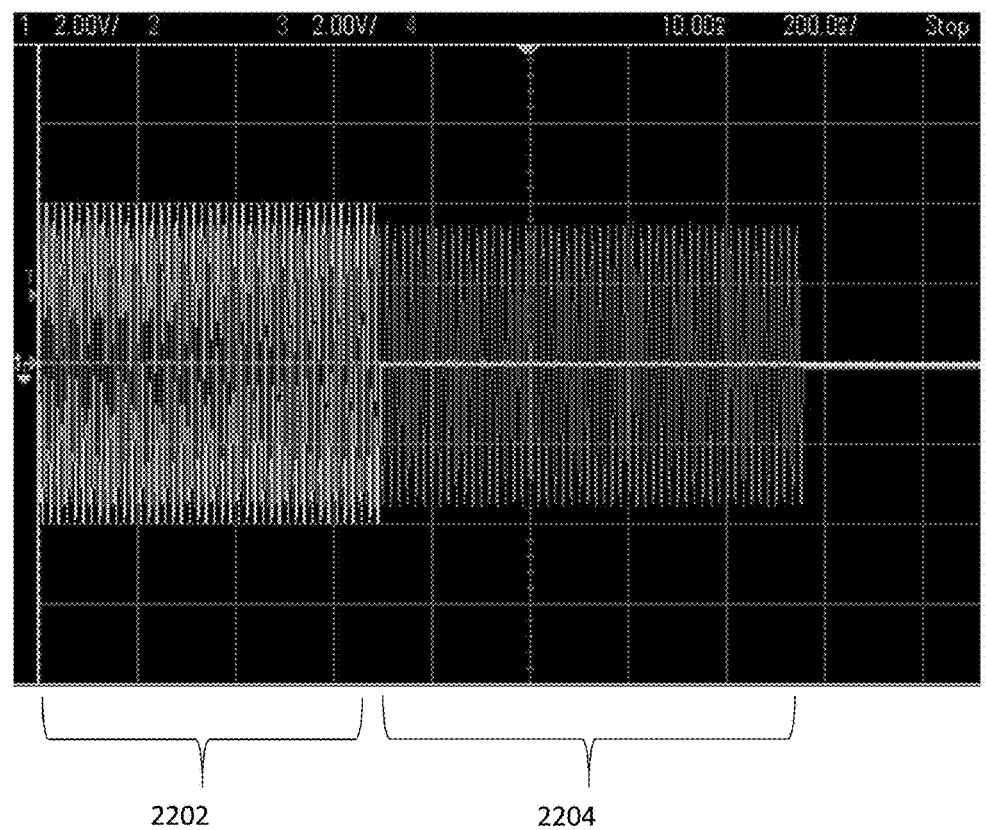

The grid voltage 2202 and inverter voltage 2204 are shown in FIG. 22. A worst case scenario in which grid has a fixed frequency was assumed. As expected, when the grid frequency is constant, a range of variations in $\Delta f_c$ is considerably smaller because there is no inherent perturbation in the frequency, and consequently islanding detection will be more difficult. Despite this difficulty, when islanding happens, the command frequency variation ($\Delta f_c$) becomes considerably smaller, and it is kept consistently positive or negative depending on the sign of frequency error.

$\Delta f_c$ becomes locked at −0.0005 Hz which is consistently negative after an islanding condition happened, while it was oscillating around zero before that. The $\Delta f_c$ value is very small even before the islanding condition occurred because the grid frequency is stable and it is set at 60 Hz, which is equal to the rated frequency. FIG. 22 displays results showing that an islanding condition is detected 0.85 sec after occurrence of the islanding condition, and the inverter gets turned off. FIG. 22 shows that inverter is turned off 0.85 sec after islanding occurs and the grid is disconnected.

The general representation of a sinusoidal field quantity is as follows:

$$i(t)=A \sin(2\pi ft+\varphi(t)) \quad [7]$$

where, A is the amplitude of the waveform, f is the frequency and $\phi$ is the phase angle of the waveform. The example embodiments illustrated throughout the disclosure utilize the dithering of the command frequency of the inverter to determine the extent and the presence of any tank condition and/or islanding condition in the grid network. In a resonant condition when leading, lagging reactive power and active power is balanced by the load on the network frequency of the inverter may be locked to that of the natural frequency of the network or the resonant tank frequency. Any amount of dithering of the command frequency may not result in any change in the frequency of the final waveform due to the inherent resonant circuit. Various examples described herein utilize this principle associated with a typical resonant network to detect the presence and the extent of the resonant circuit.

A similar corollary of a high quality factor resonant circuit is that the resultant phase angle of the circuit is zero. Accordingly, a similar dithering algorithm may be implemented that utilizes the variation of phase angle alone and checks to determine the presence and extent of a resonant circuit by measuring the magnitude of the phase angle. If the controller is able to adequately vary the phase angle then the network may not be resonant; if, however, the phase angle magnitude remains smaller than a prescribed threshold (ideally zero, practically some small angle) the controller may determine the presence of a resonant grid network, disconnect the distributed generator from the grid, and determine whether the grid is valid, as described herein. In some examples, using the phase angle may incur longer averaging operations which in turn may lead to delayed response of deactivation of the DG from the grid under islanded conditions. In some examples, frequency and phase may be utilized in conjunction with one another to improve the diagnosis of the presence of resonant conditions. One example embodiment may utilize phase variation after frequency dithering resulted in a small and constant change in commanded frequency. The combination of the two parameters for detection of resonant grid conditions may further reduce the occurrences of DG deactivation to check for grid validity. This in turn may improve power quality of the grid network and increases energy harvest from the energy source connected to the DG.

As would be appreciated by someone skilled in the relevant art(s), part or all of one or more aspects of the methods and system discussed herein may be distributed as an article of manufacture that itself comprises a computer readable medium having computer readable code means embodied thereon.

The computer readable program code means is operable, in conjunction with a computer system, to carry out all or some of the steps to perform the methods or create the system discussed herein. The computer readable medium may be a recordable medium (e.g., hard drives, compact disks, EPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer devices, systems, and servers described herein each contain a memory that will configure associated processors to implement the methods, steps, and functions disclosed herein. Such methods, steps, and functions can be carried out, e.g., by processing capability on mobile device, terminal, network processor, or by any combination of the foregoing. The memories could be distributed or local and the processors could be distributed or singular. The memories could be implemented as an electrical, magnetic or optical memory, or any combination of these or other types of storage devices. Moreover, the terms "memory", "memory storage", "memory device", or similar terms should be construed broadly enough to encompass any information able to be read from or written to an address in the addressable space accessed by an associated processor.

Aspects of the present disclosure discussed with regards to and shown in FIGS. 1-11, or any part(s) or function(s) thereof as appropriate, may be implemented using hardware, software modules, firmware, tangible computer readable media having instructions stored thereon, or a combination thereof and may be implemented in one or more computer systems or other processing systems.

The functions of the various functional elements, logical blocks, modules, and circuits elements described in connection with the example embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular data types. An implementation of the software, control modules, logic, and/or logic modules and techniques may be stored on and/or transmitted across some form of computer-readable media. In this regard, computer-readable media can be any available medium or media useable to store information and accessible by a computing device. Some example embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the example embodiments described herein illustrate example implementations, and that the functional elements, logical blocks, modules, and circuits elements may be implemented in various other ways which are consistent with the described example embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual example embodiments described and illustrated herein has discrete components and features which may be readily separated from or combined with the features of any of the other several example embodiments without departing from the scope of the present disclosure. Any recited method can be carried out in the order of events recited or in any other order which is logically possible.

It is worthy to note that any reference to "one example embodiment" or "an example embodiment" means that a particular feature, structure, or characteristic described in connection with the example embodiment is comprised in at least one example embodiment of the present disclosure. The appearances of the phrase "in one example embodiment" or "in one example embodiment" in the specification are not necessarily all referring to the same example embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Additionally, it is worthy to note that some example embodiments may be described using the expression "coupled" and "connected" along with their derivatives. These terms are not intended as synonyms for each other. For example, some example embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, example embodiments, and example embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary example embodiments and example embodiments shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed example embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or example embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

Although the various example embodiments of the devices have been described herein in connection with certain disclosed example embodiments, many modifications and variations to those example embodiments may be implemented. For example, different types of end effectors may be employed. Also, where materials are disclosed for certain components, other materials may be used. The foregoing description and following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Various example embodiments are described in the following numbered clauses:

1. A method for preventing islanding comprising: issuing a command to an inverter connected to a power source, wherein the inverter is coupled to a power grid and provides power from the power source to the power grid, wherein the command causes a frequency of a waveform output by the inverter to vary, and wherein the frequency of the waveform output by the inverter is a command frequency; determining that a amount of change of the command frequency is a constant value for a predetermined amount of time; removing the power supplied by the inverter from the power grid; and determining whether the power grid is valid.

2. The method of clause 1, further comprising upon determining that grid is not valid, foregoing reconnecting the inverter to the grid.

3. The method of clause 1, further comprising upon determining that grid is valid, reconnecting the inverter to the grid.

4. The method of clause 1, wherein the predetermined amount of time is a first predetermined amount of time, and wherein removing the power supplied by the inverter from the power grid comprises removing the power supplied by the inverter from the power grid in a second predetermined amount of time following the determining that the amount of change of the command frequency is the constant value for the first predetermined amount of time.

5. The method of clause 1, wherein determining that the amount of change of the command frequency is the constant value for the predetermined amount of time comprises determining that the amount of change of the command frequency is a positive value or negative value for the predetermined amount of time.

6. The method of clause 1, wherein the waveform is a current waveform, a voltage waveform, or a waveform of a phase of a current waveform.

7. The method of clause 1, further comprising determining whether the amount of change of the command frequency is within a first predetermined threshold.

8. The method of clause 7, further comprising determining whether the amount of change of the command frequency is within a second predetermined threshold.

9. The method of clause 8, wherein the second predetermined threshold is a range of values that is within the first predetermined threshold.

10. The method of clause 1, wherein determining that the amount of change of the command frequency is the constant value for the predetermined amount of time comprises sampling the frequency of the waveform output by the inverter at predetermined intervals.

11. The method of clause 1, wherein removing the power supplied by the inverter from the power grid comprises disconnecting the inverter from the power grid.

12. The method of clause 1, wherein determining whether the power grid is valid comprises determining whether a main power source is connected to the power grid.

13. The method of clause 12, wherein the main power source is a power source provided by an electric utility.

14. A system comprising: a power generator connected to a power grid; a circuit coupled to the power generator that provides power from the power generator to the power grid, wherein the circuit issues a command to control a frequency of a waveform applied to the power grid; wherein the circuit determines that an amount of change in the frequency applied the power grid is constant for a predetermined amount of time; and wherein the circuit removes the power supplied by the power generator from the power grid; and wherein the circuit determines whether the power grid is valid.

What is claimed is:

1. A method for preventing islanding comprising:
   issuing a command to an inverter connected to a power source, wherein the inverter is coupled to a power grid and provides power from the power source to the power grid, wherein the command causes a frequency of a waveform output by the inverter to vary, and wherein the frequency of the waveform output by the inverter is a command frequency;
   determining that a amount of change of the command frequency is a constant value for a predetermined amount of time;
   removing the power supplied by the inverter from the power grid; and
   determining whether the power grid is valid; and
   wherein the predetermined amount of time is a first predetermined amount of time, and wherein removing the power supplied by the inverter from the power grid comprises removing the power supplied by the inverter from the power grid in a second predetermined amount of time following the determining that the amount of change of the command frequency is the constant value for the first predetermined amount of time.

2. The method of claim 1, wherein determining that the amount of change of the command frequency is the constant value for the predetermined amount of time comprises determining that the amount of change of the command frequency is a positive value or negative value for the predetermined amount of time.

3. The method of claim 1, wherein the waveform is a current waveform, a voltage waveform, or a waveform of a phase of a current waveform.

4. The method of claim 1, further comprising determining whether the amount of change of the command frequency is within a first predetermined threshold.

5. The method of claim 1, wherein determining that the amount of change of the command frequency is the constant value for the predetermined amount of time comprises sampling the frequency of the waveform output by the inverter at predetermined intervals.

6. The method of claim 1, wherein removing the power supplied by the inverter from the power grid comprises disconnecting the inverter from the power grid.

7. The method of claim 1, wherein determining whether the power grid is valid comprises determining whether a main power source is connected to the power grid.

8. The method of claim 7, wherein the main power source is a power source provided by an electric utility.

9. The method of claim 1, further comprising upon determining that the power grid is not valid, foregoing reconnecting the inverter to the power grid.

10. The method of claim 1, further comprising upon determining that the power grid is valid, reconnecting the inverter to the power grid.

11. A method for preventing islanding comprising:
issuing a command to an inverter connected to a power source, wherein the inverter is coupled to a power grid and provides power from the power source to the power grid, wherein the command causes a frequency of a waveform output by the inverter to vary, and wherein the frequency of the waveform output by the inverter is a command frequency;
determining that a amount of change of the command frequency is a constant value for a predetermined amount of time;
removing the power supplied by the inverter from the power grid;
determining whether the power grid is valid;
determining whether the amount of change of the command frequency is within a first predetermined threshold; and
determining whether the amount of change of the command frequency is within a second predetermined threshold.

12. The method of claim 11, further comprising upon determining that the power grid is not valid, foregoing reconnecting the inverter to the power grid.

13. The method of claim 11, further comprising upon determining that the power grid is valid, reconnecting the inverter to the power grid.

14. The method of claim 11, wherein determining that the amount of change of the command frequency is the constant value for the predetermined amount of time comprises determining that the amount of change of the command frequency is a positive value or negative value for the predetermined amount of time.

15. The method of claim 11, wherein determining that the amount of change of the command frequency is the constant value for the predetermined amount of time comprises sampling the frequency of the waveform output by the inverter at predetermined intervals.

16. A method for preventing islanding comprising:
issuing a command to an inverter connected to a power source, wherein the inverter is coupled to a power grid and provides power from the power source to the power grid, wherein the command causes a frequency of a waveform output by the inverter to vary, and wherein the frequency of the waveform output by the inverter is a command frequency;
determining that a amount of change of the command frequency is a constant value for a predetermined amount of time;
removing the power supplied by the inverter from the power grid;
determining whether the power grid is valid;
determining whether the amount of change of the command frequency is within a first predetermined threshold;
determining whether the amount of change of the command frequency is within a second predetermined threshold; and
wherein the second predetermined threshold is a range of values that is within the first predetermined threshold.

17. The method of claim 16, further comprising upon determining that the power grid is not valid, foregoing reconnecting the inverter to the power grid.

18. The method of claim 16, further comprising upon determining that the power grid is valid, reconnecting the inverter to the power grid.

19. The method of claim 16, wherein determining that the amount of change of the command frequency is the constant value for the predetermined amount of time comprises determining that the amount of change of the command frequency is a positive value or negative value for the predetermined amount of time.

20. The method of claim 16, wherein determining that the amount of change of the command frequency is the constant value for the predetermined amount of time comprises sampling the frequency of the waveform output by the inverter at predetermined intervals.

* * * * *